United States Patent
Hamlisch et al.

(10) Patent No.: US 8,229,783 B2
(45) Date of Patent: *Jul. 24, 2012

(54) IDENTIFYING INDUSTRY SEGMENTS WITH HIGHEST POTENTIAL FOR NEW CUSTOMERS OR NEW SPENDING FOR CURRENT CUSTOMERS

(75) Inventors: Eliot R. Hamlisch, New York, NY (US); Dan Cheung Tat Chan, Fanwood, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,837

(22) Filed: Apr. 22, 2011

(65) Prior Publication Data

US 2011/0202386 A1 Aug. 18, 2011

Related U.S. Application Data

(63) Continuation of application No. 11/636,980, filed on Dec. 12, 2006, now Pat. No. 7,953,627.

(51) Int. Cl.
G06Q 10/00 (2012.01)
G06Q 30/00 (2012.01)
(52) U.S. Cl. .................................................. 705/7.33
(58) Field of Classification Search ................... 705/7.33
See application file for complete search history.

(56) References Cited

U.S. PATENT DOCUMENTS

| | | | |
|---|---|---|---|
| 5,963,910 A | 10/1999 | Ulwick | |
| 6,061,658 A * | 5/2000 | Chou et al. | 705/7.33 |
| 6,430,539 B1 * | 8/2002 | Lazarus et al. | 705/7.31 |
| 6,647,374 B2 * | 11/2003 | Kansal | 705/37 |
| 6,708,156 B1 | 3/2004 | Gonten | |
| 6,839,682 B1 | 1/2005 | Blume et al. | |
| 6,925,441 B1 | 8/2005 | Jones et al. | |
| 7,003,476 B1 * | 2/2006 | Samra et al. | 705/7.28 |

(Continued)

OTHER PUBLICATIONS

Wind, Yoram et al., Segmenting Industrial Markets Advances in Business Marketing and Purchasing, vol. 6, 1994.*

(Continued)

*Primary Examiner* — Scott L Jarrett
(74) *Attorney, Agent, or Firm* — Snell & Wilmer L.L.P.

(57) ABSTRACT

A method and system are used to identify industry segments with highest potential for new customers or new spending for current customers. This includes receiving data, segregated into each of a plurality of industries, relating to a number of small businesses, cost of goods sold for each of the small businesses, and percentage of cost of goods sold that is spent on raw materials and inventory for each of the small businesses. Capturing data, segregated into each of the plurality of industries, relating to average amount charged per current card member, percentage of the current card members charging the raw materials and the inventory, percentage of card member penetration, and total estimated charging for the current card members. Determining which of the plurality of industries or segments of the plurality of the industries are available for a highest potential for new card members or that are available for a greatest amount of incremental increased charging by the current card members. Communicating with the current card members in each of the plurality of industries or segments and receiving data therefrom based on one or more of the previous steps. Communicating with internal and external sources to capture additional industry-specific charging data. Receiving data relating to industry reports and census data. Generating ranked data sets based on the previous steps.

20 Claims, 21 Drawing Sheets

U.S. PATENT DOCUMENTS

| | | | |
|---|---|---|---|
| 7,035,811 B2* | 4/2006 | Gorenstein | 705/7.33 |
| 7,130,865 B2* | 10/2006 | Moore | 1/1 |
| 7,228,555 B2* | 6/2007 | Schlack | 725/35 |
| 7,349,877 B2 | 3/2008 | Ballow et al. | |
| 7,376,610 B2* | 5/2008 | Schneider | 705/36 R |
| 7,412,398 B1* | 8/2008 | Bailey | 705/7.31 |
| 7,415,437 B2 | 8/2008 | Marvin et al. | |
| 7,472,072 B2* | 12/2008 | Kowalchuk | 705/7.32 |
| 7,690,564 B2 | 4/2010 | Rane et al. | |
| 7,801,757 B2* | 9/2010 | Lee | 705/7.33 |
| 7,805,363 B2* | 9/2010 | Haggerty et al. | 705/38 |
| 7,831,454 B2* | 11/2010 | Nguyen et al. | 705/7.34 |
| 7,835,940 B2* | 11/2010 | Kowalchuk | 705/7.33 |
| 7,840,522 B2* | 11/2010 | Liu et al. | 706/62 |
| 7,853,469 B2 | 12/2010 | Maitland et al. | |
| 7,882,001 B2* | 2/2011 | Nahum | 705/35 |
| 7,890,367 B2* | 2/2011 | Senghore et al. | 705/14.28 |
| 7,921,118 B2* | 4/2011 | Moore | 707/748 |
| 7,937,286 B2* | 5/2011 | Newman et al. | 705/7.31 |
| 7,953,627 B2* | 5/2011 | Hamlisch et al. | 705/7.13 |
| 7,966,212 B2* | 6/2011 | Kasravi et al. | 705/7.32 |
| 7,991,666 B2* | 8/2011 | Haggerty et al. | 705/35 |
| 8,010,403 B2* | 8/2011 | Kala et al. | 705/7.33 |
| 8,112,458 B1* | 2/2012 | Kumar et al. | 707/805 |
| 8,117,202 B1* | 2/2012 | Kozyrczak et al. | 707/736 |
| 2001/0027455 A1* | 10/2001 | Abulleil et al. | 707/102 |
| 2003/0061132 A1 | 3/2003 | Yu et al. | |
| 2003/0149610 A1 | 8/2003 | Rowan et al. | |
| 2003/0172013 A1 | 9/2003 | Block et al. | |
| 2004/0186765 A1* | 9/2004 | Kataoka | 705/10 |
| 2004/0199417 A1 | 10/2004 | Baxter et al. | |
| 2004/0199422 A1 | 10/2004 | Napier et al. | |
| 2005/0251439 A1 | 11/2005 | Fenich | |
| 2006/0069585 A1 | 3/2006 | Springfield et al. | |
| 2006/0253345 A1 | 11/2006 | Heber | |
| 2007/0067206 A1 | 3/2007 | Haggerty et al. | |
| 2008/0133325 A1* | 6/2008 | De et al. | 705/10 |

OTHER PUBLICATIONS

Papadopoulos, N. et al., Toward a tradeoff model for international market selection International Business Review, vol. 22, 2002.*

Berry, Alexander, Using Market Segementation for Corporate Customers Commercial Lending REview, vol. 10, No. 3, Summer 1995.*

Francese, Paula A. et al., Finding the Customer American Demographics, vol. 13 No. 1, Jan. 1991.*

James, Karen E., Identifying Market Segments and Selecting Target Markets Lousiana State University, 2003.*

Baker, Deborah, Segmenting and Targeting Markets Texas Christian University, 2002.*

Overstreet, George, Creating Value in oversupplied markets: The case of Charlottesville Virginia hotels Cornell Hotel and Restaurant Administration Quaterly, vol. 34, No. 5, Oct. 1993.*

Acuity's MDM—Market Development Methodology Acuity, Inc. Mar. 7, 2005, Retrieved from Archive.org Mar. 27, 2012.*

Weinsten, Art, Handbook of Market Segmentation The Haworth Press, Inc, 2004, ISBN 0-7890-2156-0, Table of Contents.*

Reategui, Eliseo et al., A Classification System for Credit Card Transactions Advances in Case-Based Reasoning, Proceedings of the Second European Workshop EWCBR-94, 1994.*

Cabena, Peter et al., Intelligent Miner for Data Applications Guide IBM, Mar. 1999.*

Porter, Michael, Competitive Strategy: Techniques for Analyzing Industries and Compettitors The Free Pres, 1980.

Sayegh, Lisa, Where is My Market? How to Use Data to Find and Validate New Commercial Lines Market Niches 2001.

Bhasin, Madan Lal Dr., Data Mining: A Competitive Tool in the Banking and Retail Industries The Chartered Accountact, Oct. 2006.

Parker, Steven, Data Mining in The Financial Services Industry Standard Chartered, Feb. 15, 2001.

James, Karen E., Chapter 9—Identifying Market Segments and Selecting Target Markets Lousiana State University, 2003.

Meadows, Maureen et al., Assessing the implementation of market segmentation in retail financial services International Journal of Service Industry Management, vol. 9, No. 3, 1998.

Customer Segementation at AMEX Harvard Business Review, vol. 73, No. 3, May 1995.

Growing the business card Funds Transfer Report, Dec. 1994.

HNC SYstem Sheds Light on Cardholder Profile Card News Dec. 7, 1998.

First Data Teams with ieWild on New Internet Technology Card News, Mar. 7, 2001.

Cabena, Peter et al., Intelligent Miner for Data Applications Guide IBM, Redbook, SG24-5252-00, Mar. 1999.

Berry, Alexander, Using Market Segmentation for Corporate Customers Commercial Lending Review, vol. 10, No. 3, Summer 1995.

Angel, Gary et al., Using Card Transaction Data American Demographics, vol. 20. No. 8, Aug. 1998.

USPTO; Notice of Allowance dated Jan. 19, 2011 in U.S. Appl. No. 11/636,980.

USPTO; Office Action dated Nov. 24, 2010 in U.S. Appl. No. 11/636,980.

USPTO; Office Action dated Jun. 30, 2010 in U.S. Appl. No. 11/636,980.

* cited by examiner

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank | COGS $ Amount | Rank | Commulative Rank |
|---|---|---|---|---|---|---|---|---|---|---|---|---|---|
| | 1 | Construction | Construction | 0 | 1521 | General Contractors-Single-Family Houses | 278,785 | 3 | 81.9% | 6 | $76,015,566,900 | 1 | 39 |
| | 1 | Construction | Construction | 0 | 1711 | Plumbing, Heating and Air-Conditioning | 138,711 | 11 | 67.1% | 14 | $42,003,996,100 | 5 | 107 |
| | 1 | Construction | Construction | 0 | 1542 | General Contractors-Nonresidential Buildings, Other than Industrial Buildings and Warehouses | 41,084 | 36 | 81.9% | 6 | $43,391,439,000 | 2 | 108 |
| | 1 | Construction | Construction | 0 | 1761 | Roofing, Siding, and Sheet Metal Work | 49,693 | 30 | 82.1% | 4 | $16,878,200,100 | 13 | 119 |
| | 1 | Construction | Construction | 0 | 1731 | Electrical Work | 94,217 | 17 | 69.6% | 13 | $32,178,168,000 | 7 | 120 |
| | 1 | Construction | Construction | 0 | 1522 | General Contractors-Residential Buildings, Other Than Single-Family | 43,824 | 32 | 81.9% | 6 | $17,304,241,500 | 12 | 130 |
| | 1 | Construction | Construction | 0 | 1799 | Special Trade Contractors, Not Elsewhere Classified | 88,087 | 18 | 64.3% | 16 | $17,988,503,700 | 11 | 149 |
| | 1 | Construction | Construction | 0 | 1742 | Plastering, Drywall, Acoustical, and Insulation Work | 28,799 | 47 | 70.6% | 11 | $9,697,333,600 | 29 | 236 |
| | 1 | Construction | Construction | 0 | 5063 | Electrical Apparatus and Equipment Wiring Supplies, and Construction Materials | 14,449 | 69 | 79.6% | 7 | $12,922,184,400 | 23 | 242 |
| | 1 | Construction | Construction | x | 1721 | Painting and Paper Hanging | 72,998 | 22 | % | 49 | $ | 67 | 490 |
| 1 | Summary | Construction | Construction | | | | 850,647 | | 75.16% | | $268,379,633,300 | | 1 |
| | 3 | Grocery | Grocery | x | 5411 | Grocery Stores | 113,419 | 15 | 73.4% | 10 | $42,932,761,000 | 3 | 89 |
| | 3 | Grocery | Grocery | x | 5149 | Groceries and Related Products, Not Elsewhere Classified | 13,897 | 71 | 85.1% | 2 | $9,919,085,800 | 28 | 236 |
| | 3 | Grocery | Grocery | 0 | 5499 | Miscellaneous Food Stores | 24,488 | 52 | 73.4% | 10 | $3,934,827,200 | 50 | 304 |
| 2 | Summary | Grocery | Grocery | | | | 151,804 | | 73.67% | | $56,786,674,000 | | 2 |
| | 2 | Automotive | Automotive | 0 | 5013 | Motor Vehicle Supplies and New Parts | 20,162 | 58 | 82% | 5 | $13,397,734,000 | 19 | 198 |
| | 2 | Automotive | Automotive | x | 7699 | Repair Shops and Related Services, Not Elsewhere Classified | 127,732 | 13 | 49.6% | 24 | $13,311,449,600 | 20 | 206 |
| | 2 | Automotive | Automotive | 0 | 7538 | General Automotive Repair Shops | 120,384 | 14 | 50.4% | 23 | $11,675,714,400 | 25 | 218 |
| | 2 | Automotive | Automotive | 0 | 7532 | Top, body, and Upholstery Repair Shops and Paint Shops | 55,716 | 29 | 44.1% | 28 | $5,934,845,700 | 39 | 315 |
| 3 | Summary | Automotive | Auto After Market | | | | 323,994 | | 50.8% | | $44,319,743,700 | | 3 |
| | 3 | Retail | 5999 Miscellaneous Retail Stores, Not Elsewhere Classified | 0 | 5999 | Miscellaneous Retail Stores, Not Elsewhere Classified | 133,814 | 12 | 62.1% | 18 | $24,999,162,300 | 9 | 141 |

FIG. 4A

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank |
|---|---|---|---|---|---|---|---|---|---|---|
| 4 | Summary | Retail | 5999 Miscellaneous Retail Stores, Not Elsewhere Classified | | | | 133,814 | | 62.1% | |
| 5 | 2 | Automotive | Auto Dealers | 0 | 5511 | Motor Vehicle Dealers (New and Used) | 19,202 | 59 | 88.3% | 1 |
| | Summary | Automotive | Auto Dealers | | | | 19,202 | | 88.3% | |
| | 3 | Pharmacy | Pharmacy | 0 | 5912 | Drug Stores and Proprietary Stores | 23,426 | 53 | 76.3% | 9 |
| | 3 | Pharmacy | Pharmacy | 0 | 5122 | Drugs, Drug Proprietaries, and Druggists' Sundries | 7,830 | 76 | 83.4% | 3 |
| 6 | Summary | Pharmacy | Pharmacy | | | | 31,256 | | 77.08% | |
| | 3 | Other | 5199 Nondurable Goods, Not Elsewhere Classified | 0 | 5199 | Nondurable Goods, Not Elsewhere Classified | 41,999 | 33 | 76.7% | 8 |
| 7 | Summary | Other | 5199 Nondurable Goods, Not Elsewhere Classified | | | | 41,999 | | 76.7% | |
| | 2 | Computers | Services & Software | 0 | 7379 | Computer Related Services, Not Elsewhere Classified | 58,862 | 27 | 49.5% | 25 |
| | 2 | Computers | Services & Software | 0 | 7371 | Computer Programming Services | 39,764 | 37 | 49.5% | 25 |
| | 2 | Computers | Services & Software | 0 | 7374 | Computer Processing and Data Preparation and Processing Services | 23,295 | 55 | 49.5% | 25 |
| | 2 | Computers | Services & Software | 0 | 7372 | Prepackaged Software | 15,759 | 66 | 49.5% | 25 |
| | 2 | Computers | Services & Software | 0 | 7373 | Computer Integrated Systems Design | 18,675 | 60 | 32.4% | 34 |
| | 2 | Computers | Services & Software | 0 | 7378 | Computer Maintenance and Repair | 12,473 | 72 | 49.5% | 25 |
| 8 | Summary | Computers | Services & Software | | | | 168,828 | | 47.81% | |
| | 2 | Restaurants | Restaurants | 0 | 5812 | Eating Places | 294,995 | 2 | 40.0% | 32 |
| 9 | Summary | Restaurants | Restaurants | | | | 294,995 | | 40.0% | |
| | 2 | Electronics | Electronics Wholesale | 0 | 5065 | Electronic Parts and Equipment, Not Elsewhere Classified | 14,870 | 68 | 79.6% | 7 |
| | 2 | Electronics | Electronics Wholesale | 0 | 5064 | Electrical Appliances, Television and Radio Sets | 3,273 | 77 | 79.6% | 7 |
| 10 | Summary | Electronics | Electronics Wholesale | | | | 18,143 | | 79.6% | |
| | 2 | Furniture | Furniture | 0 | 5712 | Furniture Stores | 41,103 | 35 | 59.9% | 20 |
| | 2 | Furniture | Furniture | 0 | 5719 | Miscellaneous home furnishings Stores | 17,070 | 61 | 59.9% | 20 |
| 11 | Summary | Furniture | Furniture | | | | 58,173 | | 59.9% | |

FIG. 4B

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank | COGS $ Amount | Rank | Commulative Rank |
|---|---|---|---|---|---|---|---|---|---|---|---|---|---|
| | 3 | Other | 7389 Business Services, Note Elsewhere Classified | 0 | 7389 | Business Services, Not Elsewhere Classified | 446,659 | 1 | 31.1% | 35 | $28,680,420,000 | 8 | 201 |
| 12 | Summary | Other | 7389 Business Services, Not Elsewhere Classified | | | | 446,659 | | 31.1% | | $28,680,420,000 | | 12 |
| | 2 | Sporting Goods | Sporting Goods | 0 | 5941 | Sporting Goods Stores and Bicycle Shops | 45,626 | 31 | 62.6% | 17 | $8,428,088,400 | 30 | 237 |
| | 2 | Sporting Goods | Sporting Goods | 0 | 5091 | Sporting and Recreational Goods and Supplies | 8,968 | 75 | 64.6% | 15 | $4,163,922,200 | 49 | 372 |
| 13 | Summary | Sporting Goods | | | | | 54,594 | | 62.8% | | $12,592,010,600 | | 13 |
| | 2 | Apparel | Apparel | 0 | 5621 | Women's Clothing Stores | 36,492 | 40 | 56.0% | 21 | $4,516,288,000 | 45 | 320 |
| | 2 | Apparel | Apparel | 0 | 5699 | Miscellaneous Apparel and Accessory Stores | 28,831 | 46 | 56.0% | 21 | $3,460,632,000 | 53 | 356 |
| | 2 | Apparel | Apparel | 0 | 5661 | Shoe Stores | 14,927 | 67 | 56.0% | 21 | $2,847,992,000 | 60 | 419 |
| | 2 | Apparel | Apparel | 0 | 5611 | Men's and Boys' Clothing and Accessory Stores | 10,717 | 73 | 56.0% | 21 | $2,506,168,000 | 61 | 434 |
| 14 | Summary | Apparel | | | | | 90,967 | | 56.0% | | $13,331,080,000 | | 14 |
| | 2 | Advertising | Production | 0 | 2752 | Commercial Printing, Lithographic | 26,754 | 49 | 49.5% | 25 | $8,308,624,500 | 31 | 316 |
| | 2 | Advertising | Production | 0 | 7336 | Comercial Art and Graphic Design | 41,217 | 34 | 49.4% | 26 | $4,205,125,600 | 48 | 342 |
| | 2 | Advertising | Production | 0 | 7812 | Motion Picture and Video Tape Production | 33,159 | 42 | 46.7% | 27 | $4,411,889,100 | 47 | 360 |
| 15 | Summary | Advertising | Production | | | | 101,130 | | 48.7% | | $16,925,639 | | 15 |
| | 3 | Other | 4724 Travel Agencies | 0 | 4724 | Travel Agencies | 29,672 | 45 | 61.3% | 19 | $14,896,880,800 | 16 | 233 |
| 16 | Summary | Other | 4724 Travel Agencies | | | | 29,672 | | 61.3% | | $14,896,880,800 | | 16 |
| | 2 | Consulting | Consulting | 0 | 8742 | Management Consulting Services | 163,266 | 9 | 28.6% | 37 | $16,040,996,400 | 14 | 245 |
| | 2 | Consulting | Consulting | 0 | 8748 | Business Consulting Services, Not Elsewhere Classified | 151,536 | 10 | 7.4% | 45 | $3,074,174,600 | 57 | 416 |
| 17 | Summary | Consulting | Consulting | | | | 314,802 | | 20.0% | | $19,115,171,000 | | 17 |
| | 3 | Other | 6411 Insurance Agents, Brokers, and Service | 0 | 6411 | Insurance Agents, Brokers, and Service | 170,922 | 8 | 27.0% | 39 | $19,055,871,00 | 10 | 241 |
| 18 | Summary | Other | 6411 Insurance Agents, Brokers, and SErvice | | | | 170,922 | | 27.0% | | $19,055,871 | | 18 |
| | 3 | Other | 7011 Hotels and Motels | 0 | 7011 | Hotels and Motels | 60,651 | 25 | 43.2% | 29 | $10,018,425,600 | 27 | 276 |
| 19 | Summary | Other | 7011 Hotels and Motels | | | | 60,651 | | 43.2% | | $10,018,425,600 | | 19 |

FIG. 4C

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank | COGS $ Amount | Rank | Commutative Rank |
|---|---|---|---|---|---|---|---|---|---|---|---|---|---|
| | 3 | Trucking | Trucking | 0 | 4212 | Local Trucking Without Storage | 81,285 | 20 | 28.40% | 38 | $6,944,765,600 | 36 | 338 |
| | 3 | Trucking | Trucking | 0 | 4213 | Trucking, Except Local | 39,689 | 38 | 30.30% | 36 | $7,585,392,900 | 33 | 355 |
| 20 | Summary | Trucking | Trucking | | | | 120,974 | | 29.03% | | $14,530,158,500 | | 20 |
| | 2 | Electronics | Electronics Retail | 0 | 5731 | Radio, Television, and Consumer Electronics Stores | 16,961 | 62 | 69.90% | 12 | $4,468,916,700 | 46 | 322 |
| 21 | Summary | Electronics | Electronics Retail | | | | 16,961 | | 69.90% | | $4,468,916,700 | | 21 |
| | 3 | Other | 7361 Employment Agencies | 0 | 7361 | Employment Agencies | 26,546 | 50 | 52.70% | 22 | $6,173,541,500 | 38 | 324 |
| 22 | Summary | Other | 7361 Employment Agencies | | | | 26,546 | | 52.70% | | $6,173,541,500 | | 22 |
| | 3 | Other | 6531 Real Estate Agents and Managers | 0 | 6531 | Real Estate Agents and Managers | 274,339 | 4 | 18.40% | 42 | $12,550,529,600 | 24 | 290 |
| 23 | Summary | Other | 6531 Real Estate Agents and Managers | | | | 274,339 | | 18.40% | | $12,550,529,600 | | 23 |
| | 2 | Computers | Computer Retailers | 0 | 5734 | Computer and Computer Software Stores | 25,145 | 51 | 49.50% | 25 | $6,239,079,000 | 37 | 338 |
| 24 | Summary | Computers | Computer Retailers | | | | 25,145 | | 49.50% | | $6,239,079,000 | | 24 |
| | 1 | Medical | MD Offices | 0 | 8011 | Offices and Clinics of Doctors of Medicine | 271,310 | 5 | 3.80% | 48 | $4,828,652,400 | 44 | 382 |
| | 1 | Medical | MD Offices | 0 | 8021 | Offices and Clinics of Dentists | 113,159 | 16 | 5.50% | 46 | $1,514,870,500 | 65 | 457 |
| | 1 | Medical | MD Offices | x | 8049 | Offices and Clinics of Health Practitioners, Not Elsewhere Classified | 71,217 | 23 | 12.30% | 43 | $1,306,493,700 | 66 | 459 |
| 25 | Summary | Medical | MD Offices | | | | 455,686 | | 4.11% | | $7,650,016,600 | | 25 |
| | 3 | Other | 8712 Architectural Services | 0 | 8712 | Architectural Services | 33,732 | 41 | 40.80% | 30 | $5,223,746,400 | 41 | 355 |
| 26 | Summary | Other | 8712 Architectural Services | | | | 33,732 | | 40.80% | | $5,223,746,400 | | 26 |
| | 2 | Computers | Computer Wholesale | 0 | 5045 | Computers and Computer Peripheral Equipment and Software | 14,147 | 70 | 49.50% | 25 | $7,548,453,000 | 34 | 367 |
| 27 | Summary | Computers | Computer Wholesale | | | | 14,147 | | 49.50% | | $7,548,453,000 | | 27 |
| | 2 | Advertising | Agencies | 0 | 7311 | Advertising Agencies | 23,319 | 54 | 40.10% | 31 | $7,220,165,400 | 35 | 368 |
| 28 | Summary | Advertising | Agencies | | | | 23,319 | | 40.10% | | $7,220,165,400 | | 28 |
| | 3 | Other | 7299 Miscellaneous Personal Services, Not Elsewhere Classified | x | 7299 | Miscellaneous Personal Services, Not Elsewhere Classified | 79,328 | 21 | 27.00% | 39 | $3,241,026,000 | 54 | 399 |
| 29 | Summary | Other | 7299 Miscellaneous Personal Services, Not Elsewhere Classified | | | | 79,328 | | 27.00% | | $3,241,026,000 | | 29 |

FIG. 4D

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank | COGS $ Amount | Rank | Commulative Rank |
|---|---|---|---|---|---|---|---|---|---|---|---|---|---|
| | 3 | Other | 5084 Industrial Machinery and Equipment | 0 | 5084 | Industrial Machinery and Equipment | 31,665 | 43 | 23.30% | 41 | $8,054,577,000 | 32 | 387 |
| 30 | Summary | Other | 5084 Industrial Machinery and Equipment | | | | 31,665 | | 23.30% | | $8,054,577,000 | | 30 |
| | 2 | Legal | Legal | 0 | 8111 | Legal Services | 222,556 | 7 | 5.10% | 47 | $3,508,346,100 | 52 | 405 |
| 31 | Summary | Legal | Legal | | | | 222,556 | | 5.10% | | $3,508,346,100 | | 31 |
| | 3 | Other | 7999 Amusement and Recreation Services, Not Elsewhere Classified | x | 7999 | Amusement and Recreation Services, Not Elsewhere Classified | 69,358 | 24 | 23.90% | 40 | $3,053,559,600 | 58 | 422 |
| 32 | Summary | Other | 7999 Amusement and Recreation Services, Not Elsewhere Classified | | | | 69,358 | | 23.90% | | $3,053,559,600 | | 32 |
| | 1 | Medical | 5047 Medical, Dental, and Hospital Equipment and Supplies | 0 | 5047 | Medical, Dental, and Hospital Equipment and Supplies | 16,709 | 63 | 36.70% | 33 | $4,941,031,100 | 43 | 420 |
| 33 | Summary | Medical | 5047 Medical, Dental, and Hospital Equipment and Supplies | | | | 16,709 | | 36.70% | | $4,941,031,100 | | 33 |
| | 3 | Other | 7231 Beauty Shops | x | 7231 | Beauty Shops | 260,708 | 6 | % | 49 | $ | 67 | 458 |
| 34 | Summary | Other | 7231 Beauty Shops | | | | 260,708 | | % | | $ | | 34 |
| | 1 | Medical | 8071 Medical Laboratories | 0 | 8071 | Medical Laboratories | 9,347 | 74 | 36.70% | 33 | $1,707,504,200 | 63 | 502 |
| 35 | Summary | Medical | 8071 Medical Laboratories | | | | 9,347 | | 36.70% | | $1,707,504,200 | | 35 |
| | 3 | Other | 7349 Building Cleaning and Maintenance Services, Not Elsewhere | x | 7349 | Building Cleaning and Maintenance Services, Not Elsewhere | 81,729 | 19 | % | 49 | $ | 67 | 484 |
| 36 | Summary | Other | 7349 Building Cleaning and Maintenance Services, Not Elsewhere | | | | 81,729 | | % | | $ | | 36 |
| | 3 | Other | 6512 Operators of Nonresidential Buildings | 0 | 6512 | Operators of Nonresidential buildings | 59,049 | 26 | % | 49 | $ | 67 | 498 |
| 37 | Summary | Other | 6512 Operators of Nonresidential Buildings | | | | 59,049 | | % | | $ | | 37 |
| | 3 | Other | 6163 Loan Brokers | 0 | 6163 | Loan Brokers | 27,038 | 48 | 12.20% | 44 | $1,861,756,600 | 62 | 502 |

FIG. 4E

| Group Ranks | High Level Classification | Segment | Sub-Segment | Sub-Sub-Segment (filter out trash) | Buyer SIC | Description | Total # of Businesses (D&B) | Rank | COGS % (Almanac) | Rank | COGS $ Amount | Rank | Commulative Rank |
|---|---|---|---|---|---|---|---|---|---|---|---|---|---|
| 38 | Summary | Other | 6163 Loan Brokers | | | | 27,038 | | 12.20% | | $1,861,756,600 | | 38 |
| | 3 | Retail | 5932 Used Merchandise Stores | x | 5932 | Used Merchandise Stores | 58,169 | 28 | % | 49 | $ | 67 | 502 |
| 39 | Summary | Retail | 5932 Used Merchandise Stores | | | | 58,169 | | % | | $ | | 39 |
| | 3 | Other | 5944 Jewelry Stores | x | 5944 | Jewelry Stores | 36,787 | 39 | % | 49 | $ | 67 | 524 |
| 40 | Summary | Other | 5944 Jewelry Stores | | | | 36,787 | | % | | $ | | 40 |
| | 3 | Other | 7359 Equipment Rental and Leasing, Not Elsewhere Classified | 0 | 7359 | Equipment Rental and Leasing, Not Elsewhere Classified | 30,921 | 44 | % | 49 | $ | 67 | 534 |
| 41 | Summary | Other | 7359 Equipment Rental and Leasing, Not Elsewhere Classified | | | | 30,921 | | % | | $ | | 41 |
| | 3 | Other | 4813 Telephone Communications, Except Radiotelephone | 0 | 4813 | Telephone Communications, Except Radiotelephone | 22,453 | 56 | % | 49 | $ | 67 | 558 |
| 42 | Summary | Other | 4813 Telephone Communications, Except Radiotelephone | | | | 22,453 | | % | | $ | | 42 |
| | 3 | Other | 5099 Durable Goods, Not Elsewhere Classified | 0 | 5099 | Durable Goods, Not Elsewhere Classified | 22,174 | 57 | % | 49 | $ | 67 | 560 |
| 43 | Summary | Other | 5099 Durable Goods, Not Elsewhere Classified | | | | 22,174 | | % | | $ | | 43 |
| | 3 | Other | 5087 Service Establishment Equipment and Supplies | 0 | 5087 | Service Establishment Equipment and Supplies | 16,420 | 64 | % | 49 | $ | 67 | 574 |
| 44 | Summary | Other | 5087 Service Establishmetn Equipment and Supplies | | | | 16,420 | | % | | $ | | 44 |
| | 3 | Other | 5961 Catalog and Mail-Order Houses | 0 | 5961 | Catalog and Mail-Order Houses | 16,223 | 65 | % | 49 | $ | 67 | 576 |
| 45 | Summary | Other | 5961 Catalog and Mail-Order Houses | | | | 16,223 | | % | | $ | | 45 |

FIG. 4F

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent: Customers Spending on RMI | Rank | % Penetration | Rank | Est. Total Plastic Opportunity (Prospects) | Rank | Commulative Rank |
|---|---|---|---|---|---|---|---|---|---|---|---|---|---|---|---|---|
|  | 2 | Computers | Computer Wholesale | 0 | 5045 | Computers and Computer Peripheral Equipment and Software | 14,147 | $56,628 | 2 | 21.66% | 1 | 23.10% | 4 | $583,891,804 | 55 | 125 |
| 1 | Summary | Computers | Computer Wholesale |  |  |  | 14,147 | $56,628 |  | 21.66% |  | 23.10% |  | $583,891,804 |  | 1 |
|  | 2 | Advertising | Agencies | 0 | 7311 | Advertising Agencies | 23,319 | $42,900 | 8 | 19.26% | 5 | 21.66% | 5 | $771,852,362 | 46 | 144 |
| 2 | Summary | Advertising | Agencies |  |  |  | 23,319 | $42,900 |  | 19.26% |  | 21.66% |  | $771,852,362 |  | 2 |
|  | 2 | Computers | Services & Software | 0 | 7373 | Computer Integrated Systems Design | 18,675 | $44,378 | 7 | 20.78% | 2 | 19.79% | 12 | $664,832,836 | 52 | 150 |
|  | 2 | Computers | Services & Software | 0 | 7371 | Computer Programming Services | 39,764 | $33,800 | 23 | 17.68% | 9 | 20.84% | 10 | $1,058,554,062 | 30 | 189 |
|  | 2 | Computers | Services & Software | 0 | 7379 | Computer Related Services, Not Elsewhere Classified | 58,862 | $28,357 | 40 | 19.09% | 6 | 17.94% | 17 | $1,363,566,484 | 26 | 247 |
|  | 2 | Computers | Services & Software | 0 | 7372 | Prepackaged Software | 15,759 | $32,164 | 27 | 16.35% | 19 | 18.83% | 14 | $410,803,074 | 68 | 315 |
|  | 2 | Computers | Services & Software | 0 | 7378 | Computer Maintenance and Repair | 12,473 | $27,553 | 48 | 19.56% | 4 | 14.03% | 41 | $298,341,010 | 72 | 389 |
|  | 2 | Computers | Services & Software | 0 | 7374 | Computer Processing and Data Preparation and Processing Services | 23,295 | $25,456 | 53 | 17.51% | 10 | 13.65% | 45 | $498,843,373 | 58 | 403 |
| 3 | Summary | Computers | Services & Software |  |  |  | 168,828 | $31,307 | 5 | 18.51% |  | 18.03% | 3 | $4,294,940,838 |  | 3 |
|  | 2 | Electronics | Electronics Wholesale | 0 | 5065 | Electronic Parts and Equipment, Not Elsewhere Classified | 14,870 | $45,557 | 5 | 16.91% | 14 | 23.71% | 3 | $496,666,382 | 59 | 183 |
|  | 2 | Electronics | Electronics Wholesale | 0 | 5064 | Electrical Appliances, Television and Radio Sets | 3,273 | $52,430 | 3 | 15.60% | 21 | 21.33% | 7 | $128,819,370 | 77 | 236 |
| 4 | Summary | Electronics | Electronics Wholesale |  |  |  | 18,143 | $46,797 |  | 16.67% |  | 23.28% |  | $625,485,752 |  | 4 |
|  | 3 | Other | 4813 Telephone Communications, Except Radiotelephone | 0 | 4813 | Telephone Communications, Except Radiotelephone | 22,453 | $41,483 | 9 | 17.92% | 8 | 17.32% | 25 | $684,394,160 | 50 | 185 |

FIG. 6A

| Group Ranks | High Level Classification | Segment | Sub-Segment | Sub-Sub-Segment (filter out trash) | Buyer SIC | Description | Total # of Businesses (DEB) | Annual Spend per Customer | Rank | Percent Customers Spending on RMI | Rank | % Penetration | Rank | Est. Total Plastic Opportunity (Prospects) | Rank | Commutative Rank |
|---|---|---|---|---|---|---|---|---|---|---|---|---|---|---|---|---|
| 5 | Summary | Other | 4813 Telephone Communications, Except Radiotelephone | | | | 22,453 | $41,483 | | 17.92% | | 17.32% | | $684,394,160 | | 5 |
| | | 2 Computers | Computer Retailers | 0 | 5734 | Computer and Computer Software Stores | 25,145 | $34,553 | 17 | 20.17% | 3 | 15.80% | 29 | $755,595,474 | 78 | 202 |
| 6 | Summary | Computers | Computer Retailers | | | | 25,145 | $34,553 | | 20.17% | | 15.80% | | $755,595,474 | | 6 |
| | | 1 Medical | 5047 Medical, Dental, and Hospital Equipment and Supplies | 0 | 5047 | Medical, Dental, and Hospital Equipment and Supplies | 16,709 | $45,844 | 4 | 16.78% | 15 | 17.44% | 23 | $601,701,316 | 54 | 192 |
| 7 | Summary | Medical | 5047 Medical, Dental, And Hospital Equipment and Supplies | | | | 16,709 | $45,844 | | 16.78% | | 17.44% | | $601,701,316 | | 7 |
| | | 2 Consulting | Consulting | 0 | 8742 | Management Consulting Services | 163,266 | $31,605 | 32 | 17.36% | 11 | 15.56% | 31 | $4,187,284,743 | 6 | 204 |
| | | 2 Consulting | Consulting | 0 | 8747 | Business Consulting Services, Not Elsewhere Classified | 151,536 | $27,751 | 47 | 14.38% | 30 | 13.37% | 46 | $3,551,777,635 | 8 | 340 |
| 8 | Summary | Consulting | Consulting | | | | 314,802 | $29,750 | | 15.92% | | 14.50% | | $7,739,062,378 | | 8 |
| | | 3 Other | 6163 Loan Brokers | 0 | 6163 | Loan Brokers | 27,038 | $36,126 | 16 | 15.88% | 20 | 17.78% | 18 | $804,458,000 | 43 | 228 |
| 9 | Summary | Other | 6163 Loan Brokers | | | | 27,038 | $36,126 | | 15.88% | | 17.78% | | $804,458,000 | | 9 |
| | | 3 Other | 5084 Industrial Machinery and Equipment | 0 | 5084 | Industrial Machinery and Equipment | 31,665 | $36,820 | 15 | 13.54% | 34 | 21.20% | 8 | $877,932,240 | 39 | 248 |
| 10 | Summary | Other | 5084 Industrial Machinery and Equipment | | | | 31,665 | $36,820 | | 13.54% | | 21.20% | | $877,932,240 | | 10 |
| | | 2 Advertising | Production | 0 | 7812 | Motion Picture and Video Tape Production | 33,159 | $33,320 | 24 | 17.15% | 12 | 17.66% | 19 | $921,335,949 | 37 | 225 |
| | | 2 Advertising | Production | 0 | 2752 | Commercial Printing, Lithographic | 26,754 | $33,951 | 20 | 13.33% | 36 | 21.51% | 6 | $684,525,948 | 49 | 292 |
| | | 2 Advertising | Production | 0 | 7336 | Commercial Art and Graphic Design | 41,217 | $22,521 | 60 | 17.00% | 13 | 17.40% | 24 | $770,723,740 | 47 | 397 |
| 11 | Summary | Advertising | Production | | | | 101,130 | $29,086 | | 16.08% | | 18.57% | | $2,376,585,637 | | 11 |

FIG. 6B

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent: Customers Spending on RMI | Rank | % Penetration | Rank | Est. Total Plastic Opportunity (Prospects) | Rank | Commulative Rank |
|---|---|---|---|---|---|---|---|---|---|---|---|---|---|---|---|---|
| | 3 | Other | 4724 Travel Agencies | 0 | 4724 | Travel Agencies | 29,672 | $56,992 | 1 | 10.75% | 63 | 26.79% | 2 | $1,017,873,534 | 32 | 259 |
| 12 | Summary | Other | 4724 Travel Agencies | | | | 29,672 | $56,992 | | 10.75% | | 26.79% | | $1,017,873,634 | | 12 |
| | 3 | Other | 5199 Nondurable Goods, Not Elsewhere Classified | 0 | 5199 | Nondurable Goods, Not Elsewhere Classified | 41,999 | $32,450 | 26 | 13.71% | 32 | 18.05% | 16 | $1,041,571,523 | 31 | 278 |
| 13 | Summary | Other | 5199 Nondurable Goods, Not Elsewhere Classified | | | | 41,999 | $32,450 | | 13.71% | | 18.05% | | $1,041,571,523 | | 13 |
| | 1 | Medical | MD Offices | 0 | 8011 | Offices and Clinics of Doctors of Medicine | 271,310 | $31,632 | 31 | 16.35% | 18 | 8.79% | 73 | $7,908,044,066 | 2 | 255 |
| | 1 | Medical | MD Offices | 0 | 8021 | Offices and Clinics of Dentists | 113,159 | $30,755 | 33 | 13.43% | 35 | 10.42% | 67 | $3,157,629,951 | 13 | 330 |
| | 1 | Medical | MD Offices | x | 8049 | Offices and Clinics of Health Practitioners, Not Elsewhere Classified | 71,217 | $16,583 | 74 | 13.30% | 37 | 7.66% | 76 | $1,126,371,026 | 29 | 541 |
| 14 | Summary | Medical | MD Offices | | | | 455,686 | $29,062 | | 15.15% | 7 | 9.02% | 20 | $12,192,045,043 | | 14 |
| | 3 | Other | 8712 Architectural Services | 0 | 8712 | Architectural Services | 33,732 | $27,865 | 45 | 18.73% | | 17.66% | | $780,521,292 | 45 | 311 |
| 15 | Summary | Other | 8712 Architectural Services | | | | 33,732 | $27,865 | | 18.73% | | 17.66% | | $780,521,292 | | 15 |
| | 1 | Medical | 8071 Medical Laboratories | 0 | 8071 | Medical Laboratories | 9,347 | $33,936 | 21 | 16.72% | 16 | 10.54% | 66 | $286,352,070 | 73 | 344 |
| 16 | Summary | Medical | 8071 Medical Laboratories | | | | 9,347 | $33,936 | | 16.72% | | 10.54% | | $286,352,070 | | 16 |
| | 1 | Construction | Construction | 0 | 1542 | General Contractors-Nonresidential Buildings, Other than Industrial Buildings and Warehouses | 41,084 | $40,484 | 11 | 13.17% | 43 | 20.13% | 11 | $1,336,673,266 | 27 | 238 |
| | 1 | Construction | Construction | 0 | 5063 | Electrical Apparatus and Equipment Wiring Supplies, and Construction Materials | 14,449 | $38,617 | 12 | 15.60% | 23 | 20.95% | 9 | $424,207,330 | 67 | 260 |
| | 1 | Construction | Construction | 0 | 1761 | Roofing, Siding, and Sheet Metal Work | 49,693 | $34,165 | 18 | 13.27% | 41 | 11.56% | 60 | $1,526,762,017 | 23 | 301 |
| | 1 | Construction | Construction | 0 | 1731 | Electrical Work | 94,217 | $33,857 | 22 | 11.22% | 60 | 17.31% | 26 | $2,666,528,194 | 14 | 322 |

FIG. 6C

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent Customers Spending on RMT | Rank | % Penetration | Rank | Est. Total Plastic Opportunity (Prospects) | Rank | Commulative Rank |
|---|---|---|---|---|---|---|---|---|---|---|---|---|---|---|---|---|
| | 1 | Construction | Construction | 0 | 1742 | Plastering, Drywall, Acoustical, and Insulation Work | 28,799 | $37,035 | 13 | 11.33% | 59 | 14.41% | 34 | $920,644,262 | 38 | 339 |
| | 1 | Construction | Construction | 0 | 1799 | Special Trade Contractors, Not Elsewhere Classified | 88,087 | $31,845 | 29 | 10.83% | 62 | 12.28% | 51 | $2,492,198,098 | 15 | 383 |
| | 1 | Construction | Construction | 0 | 1522 | General Contractors-Residential Buildings, Other Than Single-Family | 43,824 | $31,888 | 28 | 11.38% | 58 | 11.01% | 64 | $1,284,687,922 | 28 | 406 |
| | 1 | Construction | Construction | 0 | 1521 | General Contractors-Single-Family Houses | 278,785 | $28,296 | 42 | 10.07% | 65 | 12.72% | 48 | $6,994,140,582 | 3 | 417 |
| | 1 | Construction | Construction | x | 1721 | Painting and Paper Hanging | 72,998 | $27,004 | 50 | 12.86% | 45 | 11.02% | 63 | $1,766,366,607 | 18 | 434 |
| | 1 | Construction | Construction | 0 | 1711 | Plumbing, Heating nd Air-Conditioning | 138,711 | $28,208 | 43 | 9.60% | 68 | 14.02% | 42 | $3,409,541,272 | 11 | 440 |
| 17 | Summary | Construction | Construction | | | | 850,647 | $30,742 | | 10.98% | | 13.65% | | $22,821,749,551 | | 17 |
| | 3 | Other | 7361 Employment Agencies | 0 | 7361 | Employment Agencies | 26,546 | $29,855 | 35 | 15.01% | 25 | 15.69% | 30 | $678,271,886 | 51 | 347 |
| 18 | Summary | Other | 7361 Employment Agencies | | | | 26,546 | $29,855 | | 15.01% | | 15.69% | | $678,271,886 | | 18 |
| | 2 | Automotive | Auto Dealers | 0 | 5511 | Motor Vehicle Dealers (New and Used) | 19,202 | $41,190 | 10 | 12.06% | 54 | 32.01% | 1 | $491,648,130 | 60 | 323 |
| 19 | Summary | Automotive | Auto Dealers | | | | 19,202 | $41,190 | | 12.06% | | 32.01% | | $491,648,130 | | 19 |
| | 2 | Electronics | Electronics Retail | 0 | 5731 | Radio, Television, and Consumer Electronics Stores | 16,961 | $31,747 | 30 | 14.78% | 28 | 14.78% | 33 | $465,282,366 | 62 | 361 |
| 20 | Summary | Electronics | Electronics Retail | | | | 16,961 | $31,747 | | 14.78% | | 14.78% | | $465,282,366 | | 20 |
| | 3 | Other | 5961 Catalog and Mail-Order Houses | 0 | 5961 | Catalog and Mail-Order Houses | 16,223 | $34,114 | 19 | 13.65% | 33 | 14.38% | 36 | $464,461,032 | 63 | 337 |
| 21 | Summary | Other | 5961 Catalog and Mail-Order Houses | | | | 16,223 | $34,114 | | 13.65% | | 14.38% | | $464,461,032 | | 21 |
| | 3 | Pharmacy | Pharmacy | 0 | 5122 | Drugs, Drug Proprietaries, and Druggists' Sundries | 7,830 | $44,902 | 6 | 16.63% | 17 | 18.19% | 15 | $272,466,748 | 74 | 238 |
| | 3 | Pharmacy | Pharmacy | 0 | 5912 | Drug Stores and Proprietary Stores | 23,426 | $23,194 | 59 | 14.84% | 27 | 16.13% | 28 | $456,696,432 | 64 | 473 |
| 22 | Summary | Pharmacy | Pharmacy | | | | 31,256 | $28,632 | | 15.29% | | 16.65% | | $729,163,180 | | 22 |
| | 2 | Legal | Legal | 0 | 8111 | Legal Services | 222,556 | $24,609 | 55 | 14.14% | 31 | 12.07% | 54 | $4,880,137,044 | 5 | 377 |
| 23 | Summary | Legal | Legal | | | | 222,556 | $24,609 | | 14.14% | | 12.07% | | $4,880,137,044 | | 23 |

FIG. 6D

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent Customers Spending on RMI | Rank | % Penetration | Rank | Est. Total Plastic Opportunity (Prospects) |
|---|---|---|---|---|---|---|---|---|---|---|---|---|---|---|
| | 3 | Retail | 5999 Miscellaneous Retail Stores, Not Elsewhere Classified | 0 | 5999 | Miscellaneous Retail Stores, Not Elsewhere Classified | 133,814 | $28,700 | 38 | 13.10% | 44 | 11.60% | 58 | $3,460,364,460 |
| 24 | Summary | Retail | 5999 Miscellaneous Retail Stores, Not Elsewhere Classified | | | | 133,814 | $28,700 | | 13.10% | | 11.60% | | $3,460,364,460 |
| | 3 | Other | 7389 Business Services, Not Elsewhere Classified | 0 | 7389 | Business Services, Not Elsewhere Classified | 446,659 | $26,402 | 51 | 12.85% | 46 | 12.11% | 53 | $10,607,436,763 |
| 25 | Summary | Other | 7389 Business Services, Not Elsewhere Classified | | | | 446,659 | $26,402 | | 12.85% | | 12.11% | | $10,607,436,763 |
| | 3 | Other | 5087 Service Establishment Equipment and Supplies | 0 | 5087 | Service Establishment Equipment and Supplies | 16,420 | $32,629 | 25 | 13.27% | 40 | 13.95% | 43 | $442,966,258 |
| 26 | Summary | Other | 5087 Service Establishment Equipment and Supplies | | | | 16,420 | $32,629 | | 13.27% | | 13.95% | | $442,966,258 |
| | 2 | Apparel | Apparel | 0 | 5621 | Women's Clothing Stores | 36,492 | $24,507 | 56 | 15.60% | 22 | 13.75% | 44 | $794,533,572 |
| | 2 | Apparel | Apparel | 0 | 5661 | Shoe Stores | 14,927 | $28,605 | 39 | 14.86% | 26 | 11.78% | 57 | $403,956,246 |
| | 2 | Apparel | Apparel | 0 | 5611 | Men's and Boys' Clothing and Accessory Stores | 10,717 | $25,457 | 52 | 12.38% | 48 | 17.55% | 22 | $229,441,621 |
| | 2 | Apparel | Apparel | 0 | 5699 | Miscellaneous Apparel and Accessory Stores | 28,831 | $20,108 | 67 | 13.25% | 42 | 12.19% | 52 | $516,972,104 |
| 27 | Summary | Apparel | Apparel | | | | 90,967 | $23,897 | | 14.36% | | 13.38% | | $1,944,903,543 |
| | 3 | Other | 7359 Equipment Rental and Leasing, Not Elsewhere Classified | 0 | 7359 | Equipment Rental and Leasing, Not Elsewhere Classified | 30,921 | $30,465 | 34 | 12.21% | 51 | 12.01% | 55 | $826,325,954 |
| 28 | Summary | Other | 7359 Equipment Rental and Leasing, Not Elsewhere Classified | | | | 30,921 | $30,465 | | 12.21% | | 12.01% | | $826,325,954 |

FIG. 6E

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent: Customers Spending on RMI | Rank | % Penetration | Rank | Est. Total Plastic Opportunity (Prospects) | Rank | Cumulative Rank |
|---|---|---|---|---|---|---|---|---|---|---|---|---|---|---|---|---|
|  | 3 | Other | 6512 Operators of Nonresidential Buildings | 0 | 6512 | Operators of Nonresidential Buildings | 59,049 | $29,172 | 36 | 12.17% | 52 | 7.79% | 75 | $1,601,481,413 | 21 | 417 |
| 29 | Summary | Other | 6512 Operators of Nonresidential Buildings |  |  |  | 59,049 | $29,172 |  | 12.17% |  | 7.79% |  | $1,601,481,413 |  | 29 |
|  | 3 | Other | 7999 Amusement and Recreation Services, Not Elsewhere Classified | x | 7999 | Amusement and Recreation Services, Not Elsewhere Classified | 69,358 | $25,294 | 54 | 13.29% | 38 | 9.23% | 70 | $1,623,457,276 | 20 | 440 |
| 30 | Summary | Other | 7999 Amusement and Recreation Services, Not Elsewhere Classified |  |  |  | 69,358 | $25,294 |  | 13.29% |  | 9.22% |  | $1,623,457,276 |  | 30 |
|  | 3 | Other | 6531 Real Estate Agents and Managers | 0 | 6531 | Real Estate Agents and Managers | 274,339 | $23,699 | 58 | 12.57% | 47 | 11.49% | 61 | $5,536,118,166 | 4 | 442 |
| 31 | Summary | Other | 6531 Real eState Agents and Managers |  |  |  | 274,339 | $23,699 |  | 12.57% |  | 11.49% |  | $5,536,118,166 |  | 31 |
|  | 3 | Other | 6411 Insurance Agents, Brokers, and Service | 0 | 6411 | Insurance Agents, Brokers, and Service | 170,922 | $22,092 | 63 | 13.27% | 39 | 12.97% | 47 | $3,276,706,837 | 12 | 440 |
| 32 | Summary | Other | 6411 Insurance Agents, Brokers, and Service |  |  |  | 170,922 | $22,092 |  | 13.27% |  | 12.97% |  | $3,276,706,837 |  | 32 |
|  | 2 | Furniture | Furniture | 0 | 5712 | Furniture Stores | 41,103 | $27,455 | 49 | 11.06% | 61 | 14.07% | 40 | $988,381,606 | 34 | 487 |
|  | 2 | Furniture | Furniture | 0 | 5719 | Miscellaneous home furnishings Stores | 17,070 | $24,454 | 57 | 11.97% | 55 | 14.94% | 32 | $362,946,587 | 70 | 565 |
| 33 | Summary | Furniture | Furniture |  |  |  | 58,173 | $26,574 |  | 11.33% |  | 14.33% |  | $1,351,328,192 |  | 33 |
|  | 2 | Sporting Goods | Sporting Goods | 0 | 5091 | Sporting and Recreational Goods and Supplies | 8,968 | $36,932 | 14 | 14.65% | 29 | 17.57% | 21 | $267,607,157 | 75 | 314 |
|  | 2 | Sporting Goods | Sporting Goods | 0 | 5941 | Sporting Goods Stores and Bicycle Shops | 45,626 | $20,904 | 64 | 12.35% | 49 | 12.30% | 50 | $850,736,518 | 40 | 533 |
| 34 | Summary | Sporting Goods | Sporting Goods |  |  |  | 54,594 | $23,537 |  | 12.73% |  | 13.17% |  | $1,118,343,675 |  | 34 |

FIG. 6F

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent Customers Spending on RMI | Rank | % Penetration | Rank | Est. Total Plastic Opportunity (Prospects) |
|---|---|---|---|---|---|---|---|---|---|---|---|---|---|---|
|  | 3 | Other | 5099 Durable Goods, Not Elsewhere Classified | 0 | 5099 | Durable Goods, Not Elsewhere Classified | 22,174 | $27,795 | 46 | 11.94% | 56 | 14.35% | 37 | $478,405,462 |
| 35 | Summary | Other | 5099 Durable Goods, Not Elsewhere Classified |  |  |  | 22,174 | $27,795 |  | 11.94% |  | 14.35% |  | $478,405,462 |
|  | 3 | Trucking | Trucking | 0 | 4213 | Trucking, Except Local | 39,689 | $28,333 | 41 | 8.51% | 72 | 14.09% | 39 | $964,929,052 |
|  | 3 | Trucking | Trucking | 0 | 4212 | Local Trucking Without Storage | 81,285 | $22,117 | 62 | 7.01% | 75 | 12.46% | 49 | $1,579,805,025 |
| 36 | Summary | Trucking | Trucking |  |  |  | 120,974 | $24,157 |  | 7.51% |  | 13.00% |  | $2,544,734,078 |
|  | 3 | Other | 7299 Miscellaneous Personal Services, Not Elsewhere Classified | x | 7299 | Miscellaneous Personal Services, Not Elsewhere Classified | 79,328 | $20,224 | 66 | 12.31% | 50 | 8.10% | 74 | $1,516,871,579 |
| 37 | Summary | Other | 7299 Miscellaneous Personal Services, Not Elsewhere Classified |  |  |  | 79,328 | $20,224 |  | 12.31% |  | 8.10% |  | $1,516,871,579 |
|  | 2 | Automotive | Auto After Market | 0 | 5013 | Motor Vehicle Supplies and New Parts | 20,162 | $28,053 | 44 | 10.44% | 64 | 19.41% | 13 | $443,291,641 |
|  | 2 | Automotive | Auto After Market | x | 7699 | Repair Shops and Related Services, Not Elsewhere Classified | 127,732 | $19,323 | 71 | 9.54% | 69 | 9.09% | 71 | $2,193,790,215 |
|  | 2 | Automotive | Auto After Market | 0 | 7532 | Top, Body, and Upholstery Repair Shops and Paint Shops | 55,716 | $19,795 | 69 | 8.71% | 71 | 11.91% | 56 | $981,253,434 |
|  | 2 | Automotive | Auto After Market | 0 | 7538 | General Automotive Repair Shops | 120,384 | $15,263 | 76 | 6.58% | 76 | 11.00% | 65 | $1,662,952,606 |
| 38 | Summary | Auto | Auto After Market |  |  |  | 323,994 | $18,439 |  | 8.35% |  | 19.93% |  | $5,281,287,897 |
|  | 2 | Restaurants | Restaurants | 0 | 5812 | Eating Places | 294,995 | $17,243 | 72 | 8.20% | 74 | 14.22% | 38 | $3,956,758,069 |
| 39 | Summary | Restaurants | Restaurants |  |  |  | 294,995 | $17,243 |  | 8.20% |  | 14.22% |  | $3,956,758,069 |
|  | 3 | Other | 7231 Beauty Shops | x | 7231 | Beauty Shops | 260,708 | $14,003 | 77 | 12.13% | 53 | 6.51% | 77 | $3,452,681,303 |
| 40 | Summary | Other | 7231 Beauty Shops |  |  |  | 260,708 | $14,003 |  | 12.13% |  | 6.51% |  | $3,452,681,303 |
|  | 3 | Other | 7349 Building Cleaning and Maintenance Services, Not Elsewhere | x | 7349 | Building Cleaning and Maintenance Services, Not Elsewhere | 81,729 | $20,100 | 68 | 9.71% | 67 | 10.40% | 68 | $1,488,105,954 |

FIG. 6G

| Group Ranks | High Level Classification | Segment | Sub-Segment | Sub-Sub-Segment (filter out trash) | Buyer SIC | Description | Total # of Businesses (D&B) | Annual Spend per Customer | Rank | Percent: Customers Spending on RMI | Rank | % Penetration | Rank | Est. Total Plastic Opportunity (Prospects) |
|---|---|---|---|---|---|---|---|---|---|---|---|---|---|---|
| 41 | Summary | Other | 7349 Building Cleaning and Maintenance Services, Not Elsewhere | | | | 81,729 | $20,100 | | 9.71% | | 10.40% | | $1,488,105,954 |
| | 3 | Grocery | Grocery | x | 5149 | Groceries and Related Products, Not Elsewhere Classified | 13,897 | $29,142 | 37 | 11.43% | 57 | 16.94% | 27 | $327,492,535 |
| | 3 | Grocery | Grocery | 0 | 5499 | Miscellaneous Food Stores | 24,488 | $22,508 | 61 | 15.04% | 24 | 11.59% | 59 | $499,092,308 |
| | 3 | Grocery | Grocery | x | 5411 | Grocery Stores | 113,419 | $17,186 | 73 | 5.91% | 77 | 9.75% | 69 | $1,807,050,373 |
| 42 | Summary | Grocery | Grocery | | | | 151,804 | | | 7.89% | | 10.71% | | $2,633,635,216 |
| | 3 | Other | 7011 Hotels and Motels | 0 | 7011 | Hotels and Motels | 60,651 | $19,662 | 70 | 9.80% | 66 | 11.13% | 62 | $998,012,103 |
| 43 | Summary | Other | 7011 Hotels and Motels | | | | 60,651 | $19,662 | | 9.80% | | 11.13% | | $998,012,103 |
| | 3 | Other | 5944 Jewelry Stores | x | 5944 | Jewelry Stores | 36,787 | $20,502 | 65 | 9.02% | 70 | 14.40% | 35 | $657,425,165 |
| 44 | Summary | Other | 5944 Jewelry Stores | | | | 36,787 | $20,502 | | 9.02% | | 14.40% | | $657,425,165 |
| | 3 | Retail | 5932 Used Merchandise Stores | x | 5932 | Used Merchandise Stores | 58,169 | $15,639 | 75 | 8.37% | 73 | 8.92% | 72 | $841,592,723 |
| 45 | Summary | Retail | 5932 Used Merchandise Stores | | | | 58,169 | $15,639 | | 8.37% | | 8.92% | | $841,592,723 |

FIG. 6H

IDENTIFYING INDUSTRY SEGMENTS WITH HIGHEST POTENTIAL FOR NEW CUSTOMERS OR NEW SPENDING FOR CURRENT CUSTOMERS

RELATED APPLICATIONS

This patent application is a continuation of and claims priority to, and the benefit of, U.S. patent application Ser. No. 11/636,980, entitled "IDENTIFYING INDUSTRY SEGMENTS WITH HIGHEST POTENTIAL FOR NEW CUSTOMERS OR NEW SPENDING FOR CURRENT CUSTOMERS" filed on Dec. 12, 2006, which is hereby incorporated by reference.

BACKGROUND

1. Field of the Invention

This invention generally relates to a system, method, and computer program product for identifying industry segments with highest potential for new customers or new spending for current customers.

2. Related Art

Card issuing companies increase their revenues through acquisition of new card members or when card members increase their spending. Benefits from using the card, e.g., reward points and the like, are one way card issuing companies try to entice card members to increase their spending. However, in a slow economic market, it's harder to use rewards as an only motivation to entice a card member to increase their spending or gain new card members.

Currently, many card issuing companies perform only incoming customer service functions, including receiving of communications from card members. In some instances, data from these communications is compiled and stored in one or more databases or other storage systems. However, the card issuing companies cannot effectively compile enough data to determine if a card member is using their spending capacity and/or utilizing the benefits of being a card member through only doing data compilation of incoming communications. This is because with such limited data, many of the card issuing companies lack the tools and technology to perform adequate spend diagnostics regarding current card members. The card issuing companies also typically lack any tools that would allow effective and efficient management of their communications with the card members, e.g. historical and/or individual data on each card member. Thus, during communications with the card members, because of the lack of specific information the card issuing companies cannot know if they should or could entice the card members to increase their spending or change their spending habits. Thus, because of the lack of technology or tools, most of the card issuing companies do not adequately and efficiently communicate with their card members, allowing their card members to remain ignorant of the full optimization of their transaction cards and spend capacity.

Also, currently there are few if any methodologies to determine best potential growth industries in which to solicit new card members.

Given the foregoing, what is needed is a system and a method for identifying industry segments with highest potential for new customers or new spending for current customers.

SUMMARY

An embodiment of the present invention is directed to a method of identifying industry segments with the highest potential for new customers or new spending for current customers. This includes receiving data, segregated into each of a plurality of industries, relating to a number of small businesses, cost of goods sold for each of the small businesses, and percentage of cost of goods sold that is spent on raw materials and inventory. Capturing data, segregated into each of the plurality of industries, relating to average amount charged per current card member, percentage of the current card members charging the raw materials and the inventory, percentage of card member penetration, and total estimated charging for the current card members. Determining which of the plurality of industries or segments of the plurality of the industries are available for a highest potential for new card members or that are available for a greatest amount of incremental increased charging by the current card members. Communicating with the current card members in each of the plurality of industries or segments and receiving data therefrom based on one or more of the previous steps. Communicating with internal and external sources to capture additional industry-specific charging data. Generating ranked data sets based on the previous steps.

Another embodiment of the present invention is directed to a system of identifying industry segments with highest potential for new customers or new spending for current customers. The system includes a database, a communications device, and a controller. The database includes (a) a first set of data, segregated into each of a plurality of industries, relating to a number of small businesses, cost of goods sold, and percentage of cost of goods sold that is spent on raw materials and inventory and (b) a second set of data, segregated into each of the plurality of industries, relating to average amount charged per current card member, percentage of the current card members charging the raw materials and the inventory, percentage of card member penetration, and total estimated charging for the current card members. The communications device is configured to (a) communicate with the current card members in each of the plurality of industries or segments and receive data therefrom and (b) communicate with external sources to capture additional industry-specific charging data. The controller is configured to, based on the data in the database and the data captured by the communications device, (a) determine which of the plurality of industries or segments of the plurality of the industries are available for a highest potential for new card members or that are available for a greatest amount of incremental increased charging by the current card members based on the first and second set of data and (b) generate ranked data sets.

In a further embodiment of the present invention, there is provided a computer program product comprising a computer useable medium having a computer program logic recorded thereon for controlling at least one processor, the computer program logic comprising computer program code devices that perform operations similar to the devices and methods in the above embodiments.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number may identify the drawing in which the reference number first appears. Similar reference numbers may indicate similar elements.

FIGS. 4A-4F show exemplary quantitative outputs from an external data analysis.

FIGS. 6A-6H show exemplary quantitative outputs from an internal data analysis.

DESCRIPTION

Figure 1:
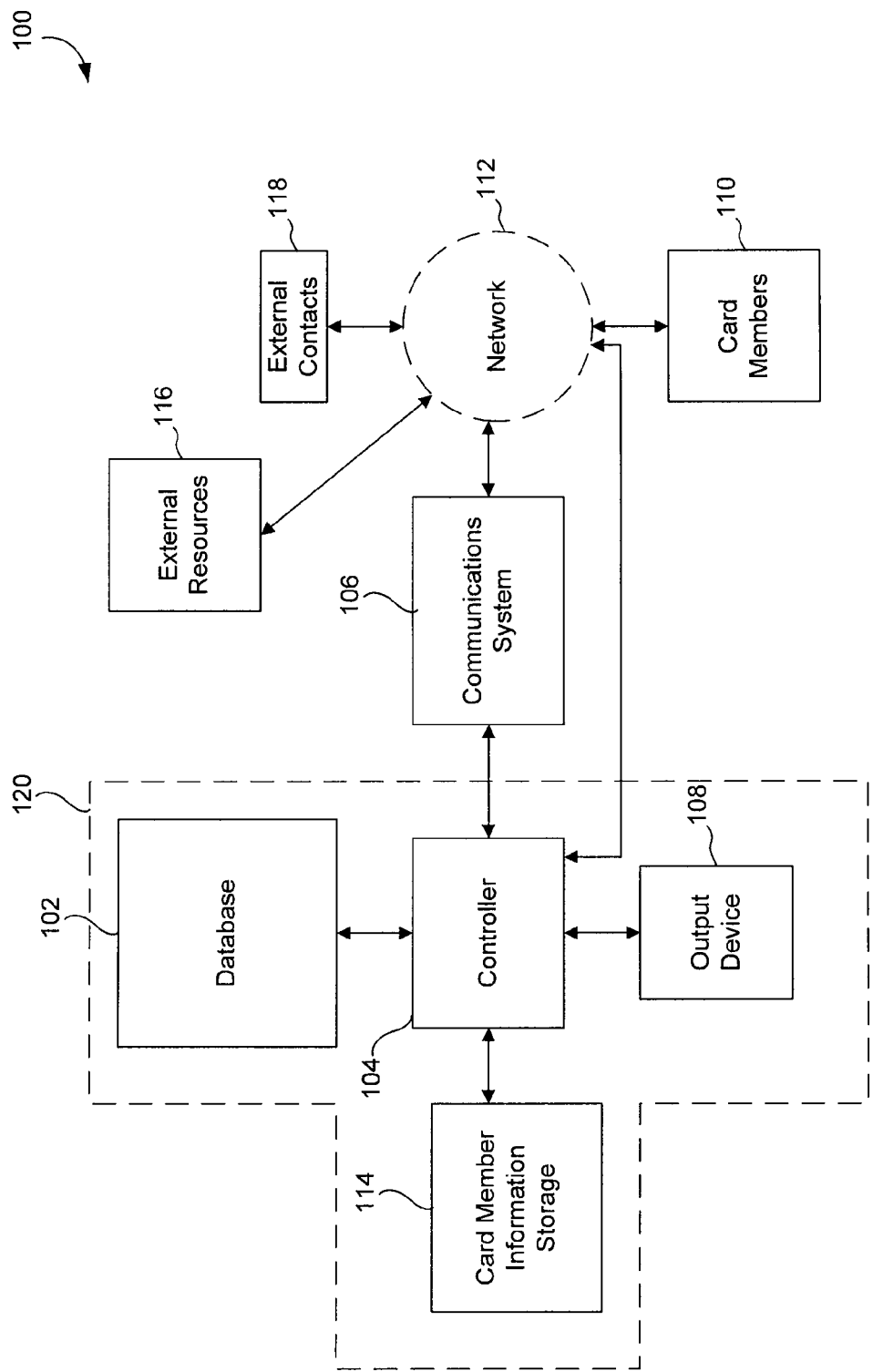
FIG. 1 shows a system.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The term "merchant" as used herein means any person, entity, distributor system, software, and/or hardware that is a provider, broker, and/or any other entity in the distribution chain of goods or services. For example, a merchant may be a credit card issuer, a hotel chain, an airline, a grocery store, a retail store, a travel agency, a service provider, including, but not limited to, a medical service provider, an online merchant, or the like.

A "transaction account" as used herein refers to an account associated with an open account card or a closed account card system (as described below). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a card that may only be accepted at a clothing retailer, such as a Saks Fifth Avenue® store.

The term "transaction instrument" as used herein may include any type of open or closed charge card, credit card, debit card, FSA card, stored value card, an RFID chip based card or token, and the like. For convenience, a transaction instrument may be referred to as a "card."

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder, and radio frequency card or payment statement).

An "issuer" or "card issuing company" issues transaction instruments, (e.g., credit cards, charge cards, debit cards, etc.). Examples of Issuers may be Bank of America, Citigroup, American Express, Capital One, etc.

Persons skilled in the relevant arts will understand the breadth of the terms used herein and that the exemplary descriptions provided are not intended to be limiting of the generally understood meanings attributed to the foregoing terms.

The following embodiments describe a system and a method for identifying industry segments with highest potential for new customers or new spending for current customers according to various embodiments and examples of the present invention. The methodology is the first of its kind, allowing a charge and credit card issuer (such as American Express) to efficiently identify potentially profitable industry segments to pursue for acquisition and usage and/or increased spending by current card members.

Referring now to the drawings, FIG. 1 shows a system 100. System 100 includes a database 102, a controller 104, a communications system 106, an output device 108, and card member storage 114. Database 102, controller 104, output device 108, and card member information storage 114 can be considered a computer system 120 (shown inside the dashed lines) including one or more personal computers, servers, and the like. These elements can be associated with an issuer or card issuing company, i.e., they can be remotely or locally coupled to the company's systems. Communications system 106 and/or controller 104 are coupled to one or more card members 110, external sources 116, and/or external contacts 118, possibly via an optional network 112.

Output device 108 can be any device allowing for visual output, such as a monitor, a graphical user interface, a handheld device, a printer, or the like.

External resources 116 can be any commercial or governmental database or any website that allows purchasing, accessing, and/or downloading of information. This information can be related to what industries different companies are categorized in and/or spending habits of these industries or companies. For example, this information can be related to their revenues, expenses (cost of goods sold (COGS)), amount of spending on raw materials and inventory, or the like. Example external sources can be, but are not limited too, the U.S. Census, Dun and Bradstreet, and/or Almanac of Business and Industrial Financial Data. Similarly, external contacts 118 can be industry experts, small business organizations, Lexis-Nexis, Forrester, Mintel, Dun and Bradstreet, BizStats, and/or Almanac of Business and Industrial Financial Data, industry reports, census data, etc.

Network 112 can be a wired or wireless telecommunications or data network, such as a cellular network, a hard-wired or optical telephone network, a satellite network, an Internet, Intranet, or Extranet network, or other similar networks, as would be apparent to a skilled artisan upon reading and understanding this description. Additionally, or alternatively, network 112 can be a domestic and/or international postal or courier network.

Database 102 can receive information from one or all of external sources 116, external contacts 118, and internal sources, e.g., card member storage 114, relating to card member and/or merchant information. For example, database 102 can include information from a purchased commercial database, e.g., Dun and Bradstreet financial information. Also, database 102 can include information relating to demographic, financial and other information submitted during enrollment of the card members 110, or information that has been collected from the card members 110 via communications system 106 or at other times. Database 102 can further include information relating to merchants that accept the card issuing company's transaction card for transactions. Database 102 can be any one of a variety of different types of databases operating based on a variety of underlying applications. For example, database 102 can be a database associated with MICROSOFT ACCESS® or the like.

Controller 104 can be one or more microprocessors or operating systems with associated applications (software applications), such as one or more computer systems. The functions performed by controller 104 can be performed by hardware, software, firmware, or a combination thereof. For example, controller 104 can filter or process data from database 102 and/or from communications system 106.

Communications system 106 can be one of several types of devices, such as a computer system, a telephone, a facsimile machine, a handheld device, a system to generate and read direct mail, a transmitter/receiver system, or the like. In regards to direct mail, an individualized report for each card member can be generated and send out with their bill monthly, quarterly, annually, or any other time period designated by a customer or the card issuing company. Thus, communications system 106 can be any device that allows for communications (e.g., telephone calls, emails, instant messaging, facsimiles, direct mailings, etc.) between controller 104 and card members 110, possibly via network 112. Communication with card members 110 can be used to compile information regarding how card members 110 use or do not use their cards. Communications system 106 can also be used to access external resources 116 and external contacts 118. This can be used to determine how these resources believe potential card members (e.g., per industry or industry sector companies) do or will spend. Then, based on all this information, a best opportunity for spend growth can be determined by the card issuing company for each card member 110 or best opportunities for potential new businesses in various industry segments.

Figure 2:
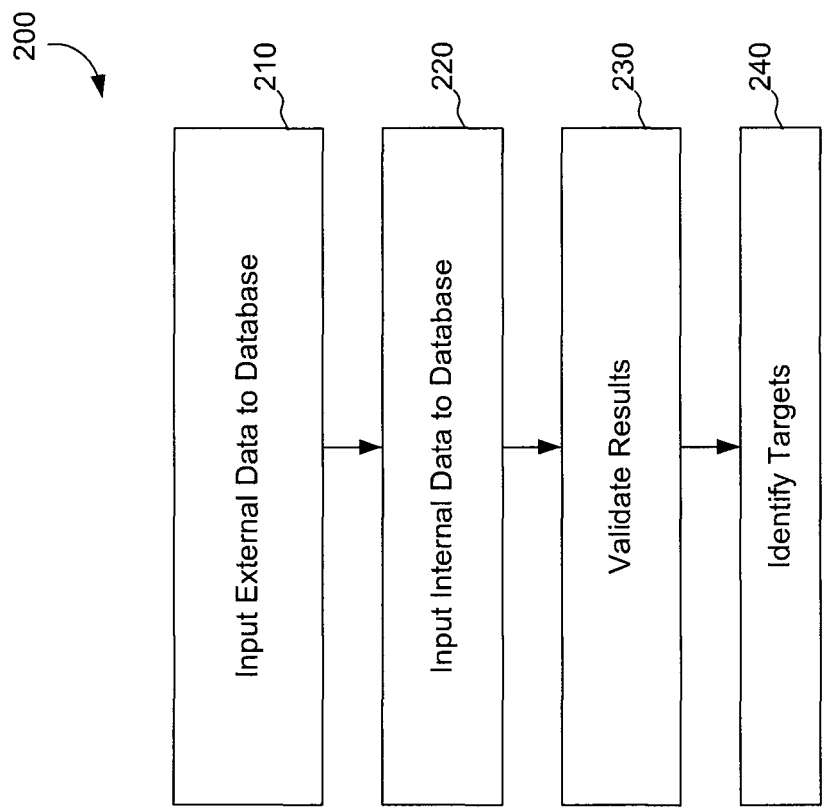
FIG. 2 is an exemplary overall method.

FIG. 2 shows a flowchart depicting a method 200. Method 200 is an overview of how to determine which existing or current card members 110 may have the greatest incremental increase in spend potential and/or for determining what industries, or segments of the industries, have the best opportunity to find potential new card members.

In step 210, external data is input into a database. External data can be data regarding industries and industry segments having spending profiles allowing for the best opportunities for potential new card members. This could also be thought of a general data gathering. External market scanning can be done through inputting data into a model to validate spend potential and segment alignment with design target. This can be considered a first data set.

In step 220, internal data is input into the database. Internal data can be data regarding current card members and current merchants. Internal market scanning can be done through data input into a model to evaluate potential charging opportunity for current card member spend behavior. This can be considered a second data set.

Thus, these first two steps may be thought of as external and internal market scans to generate the first and second data sets.

In step 230, results from steps 210 and 220 are validated. For example, this can be done through communicating with internal sources, e.g., current card members identified by the results, or communicating with external sources, e.g. external source and contacts, such as experts, consultants, and external reporting companies and agencies. This can be done to actually determine which areas or companies have favorability of charging or the highest ability to adopt charging as a way to spend. For example, while some industries or segments may appear to have a high potential, the vendors may not allow discounts if the spending is done through charging and not cash. As another example, the expenses may just be too great for charging to be a viable option, for example when raw materials or inventory is in the tens of millions.

In step 240, targets for follow up communications are determined from the data gathered in the preceding steps. For example, output from steps 210, 220, and 230 is compiled and analyzed to focus on specific segment opportunities to pursue. Thus, after step 240 a card issuing company can pursue opportunities highlighted by methodology utilizing targeted marketing tactics.

Figure 3:
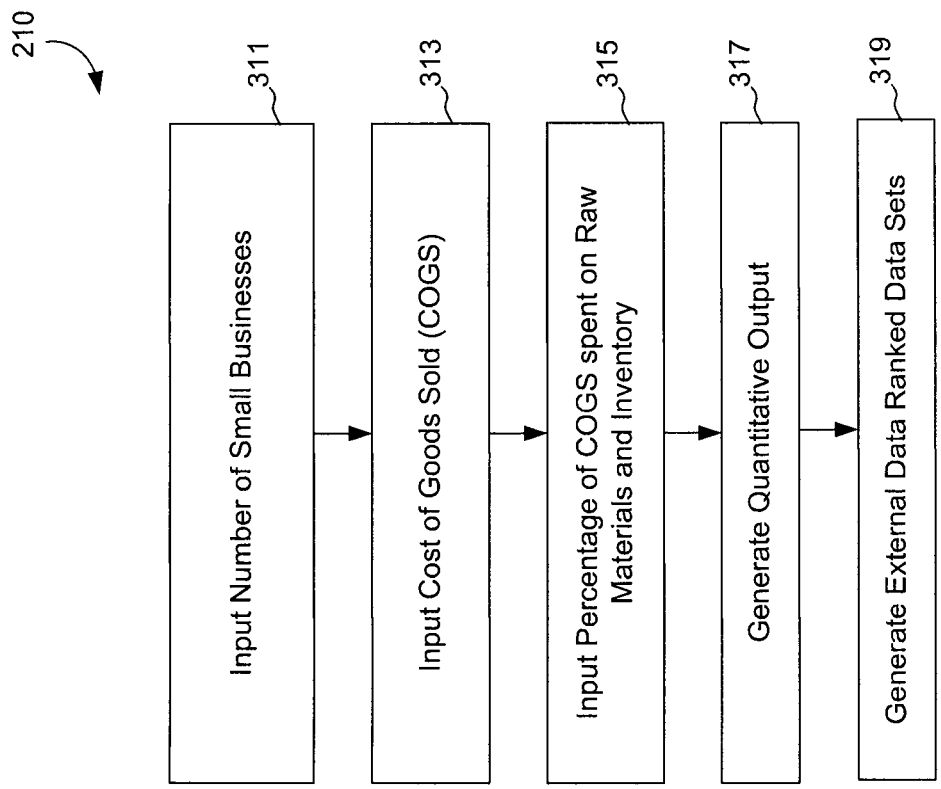
FIG. 3 shows details of a step in the method of FIG. 2.

FIG. 3 shows a flowchart depicting in detail steps occurring during step 210. In step 311, information regarding small businesses is input, for example a number of the small businesses. This can be done generally for all businesses, per industry, or per segment in different industries. An industry could be contracting or construction, with segments being painters, carpenters, electricians, plumbers, etc. or professionals, with segments being doctors, dentists, lawyers, accountants, etc. In step 313, information regarding specific or average cost of goods sold (COGS) for the small business, either generally, per industry, or per industry segment, is input. In step 315, information regarding a percentage of COGS spent on raw material and inventory for the small business, either generally, per industry, or per industry segment, is input. This may be because the companies having the highest amount of their expenses in this category are the most desirable companies to pursue as new card members. In step 317, quantitative output is generated from the data gathered in the previous steps. In step 319, external data ranked sets are generated. It is to be appreciated that other variables, either in addition to or in replace of these discussed variables, could also be used before step 317 is performed.

In one example, each of the input criteria also includes a weighted rank compared to the other input criteria. Thus, they are not all equal in determining what the best opportunities to pursue are. Also, certain minimum threshold amounts for one or more of these variables may have to be met for the company, industry, or industry segment to be included in the ranked data.

FIGS. 4A to 4F show an exemplary quantitative output for various industry segments generated for exemplary data from method 300 at step 317. For example, the groupings can be partially based on or segregated by standard industry codes established by the U.S. Census. This can be used to show what industries, segments of those industries, and companies within those segments that have the most desirable traits, so that they are pursued as new card members.

Figure 5:
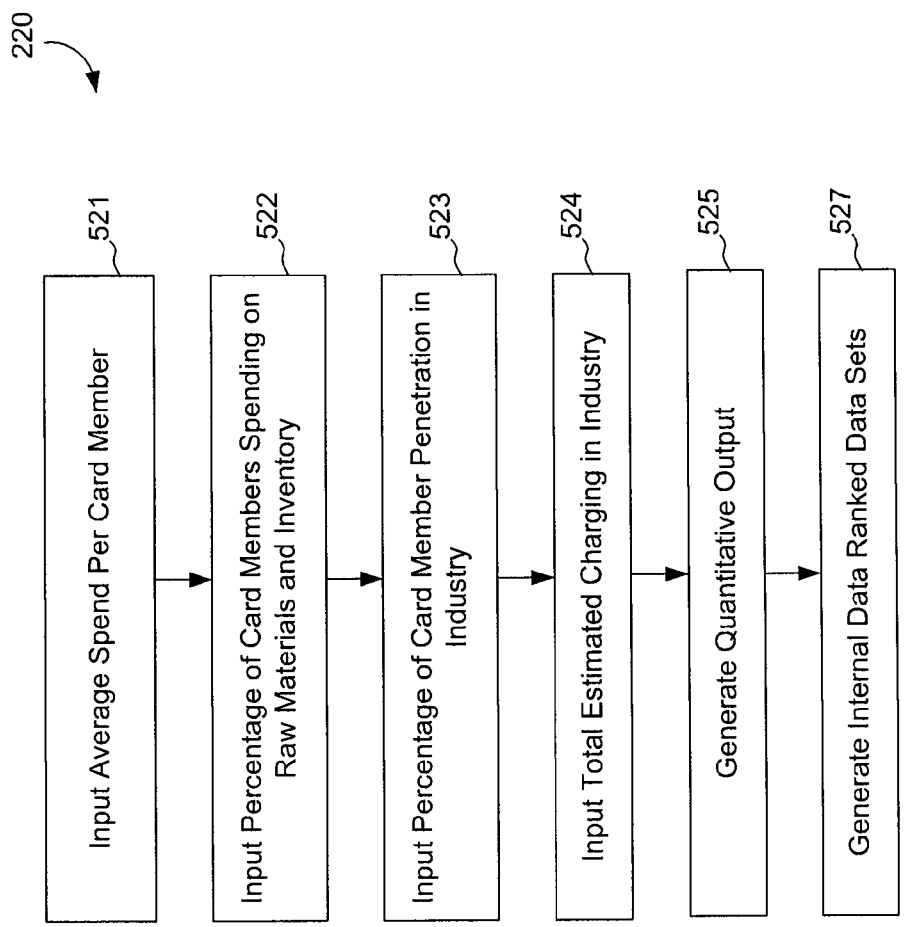
FIG. 5 shows details of another step in the method of FIG. 2.

FIG. 5 shows a flowchart depicting in detail steps occurring during step 220. In step 521, an average amount charged per current card member is input. In step 522, a percentage current card members are spending on raw materials and inventory is input. In step 523, a percentage of penetration the card issuing company has regarding a number of card members in a given industry or industry segment is input. Percentage of penetration can mean the number card members of the card issuing company in an industry divided by the total number of companies in that industry. In step 524, a total estimated amount charged for each company, industry or industry segment is input. This can be used to further segregate companies, for example a high value business may have $30,000.00 of total spending, while a very high value business has $100,000.00 of total spending. In step 525, a quantitative output based on the previous steps is generated. In step 526, internal data ranked data sets are generated. It is to be appreciated that other variables, either in addition to or in replace of these discussed variables, could also be used before step 525 is performed.

In one example, each of the input criteria also includes a weighted rank compared to the other input criteria. Thus, they are not all equal in determining what the best opportunities to pursue are. Also, certain minimum threshold amounts for one or more of these variables may have to be met for the company, industry, or industry segment to be included in the ranked data.

Similar to FIGS. 4A to 4F, FIGS. 6A to 6H show an exemplary quantitative output for various industry segments generated for exemplary data from method 500 at step 525.

Figure 7:
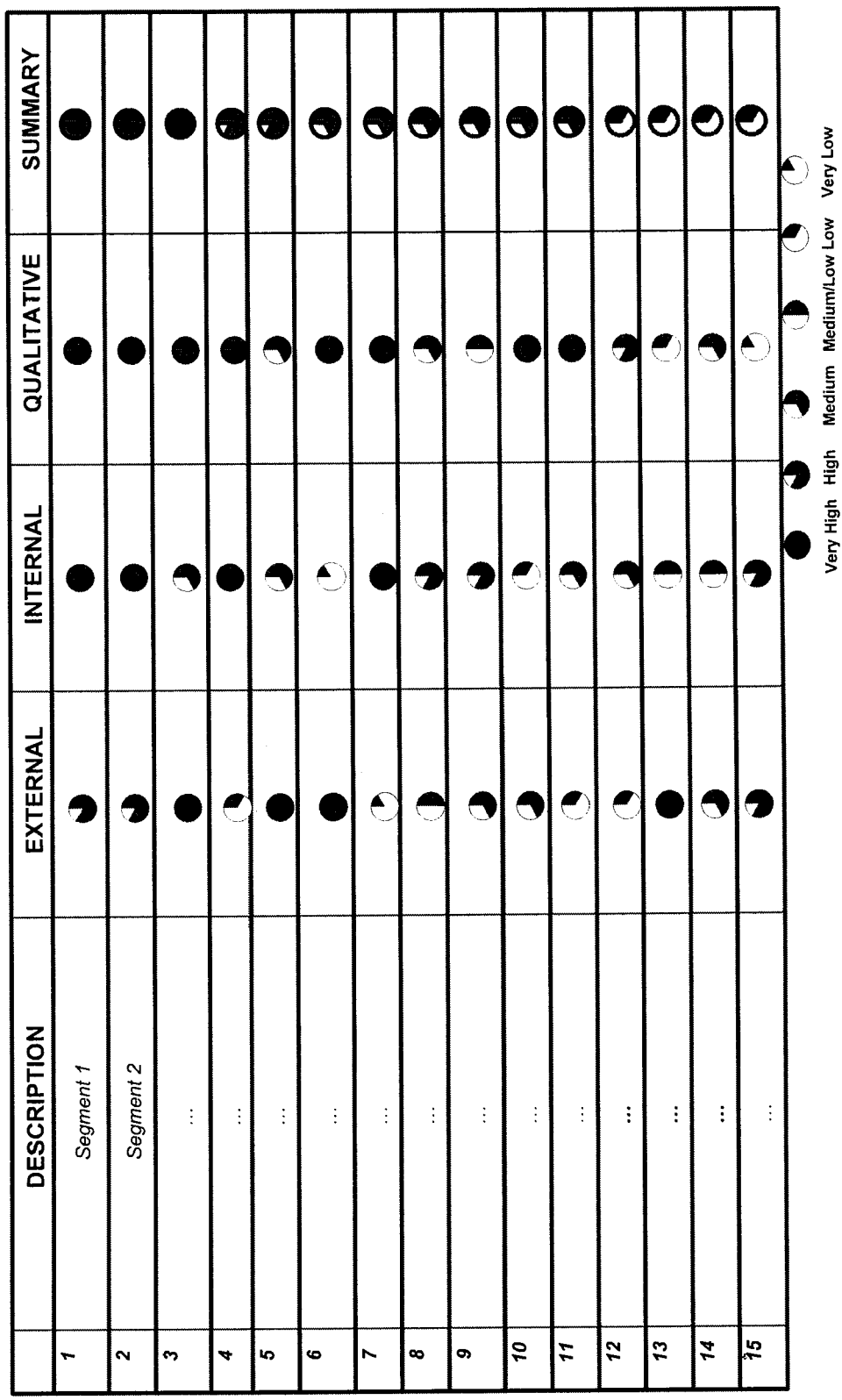
FIG. 7 shows an exemplary chart including final data rankings.

FIG. 7 shows a chart 700 including a final ranking of data sets determined after step 230. Thus, chart 700 takes into account ranked data sets generated from steps 319 and 526. Chart 700 shows segments having the greatest opportunity for charge growth. For example, each of categories external, internal, and qualitative is assigned a symbolic result of very high, high, medium, medium/low, low, or very low. The symbolic results for the three categories of each segment of each industry are averaged together to determine a summary symbolic result. Then, these summary symbolic results are ranked, as shown. Thus, the segments having the highest summary symbolic results are identified as having a highest potential.

Figure 8:
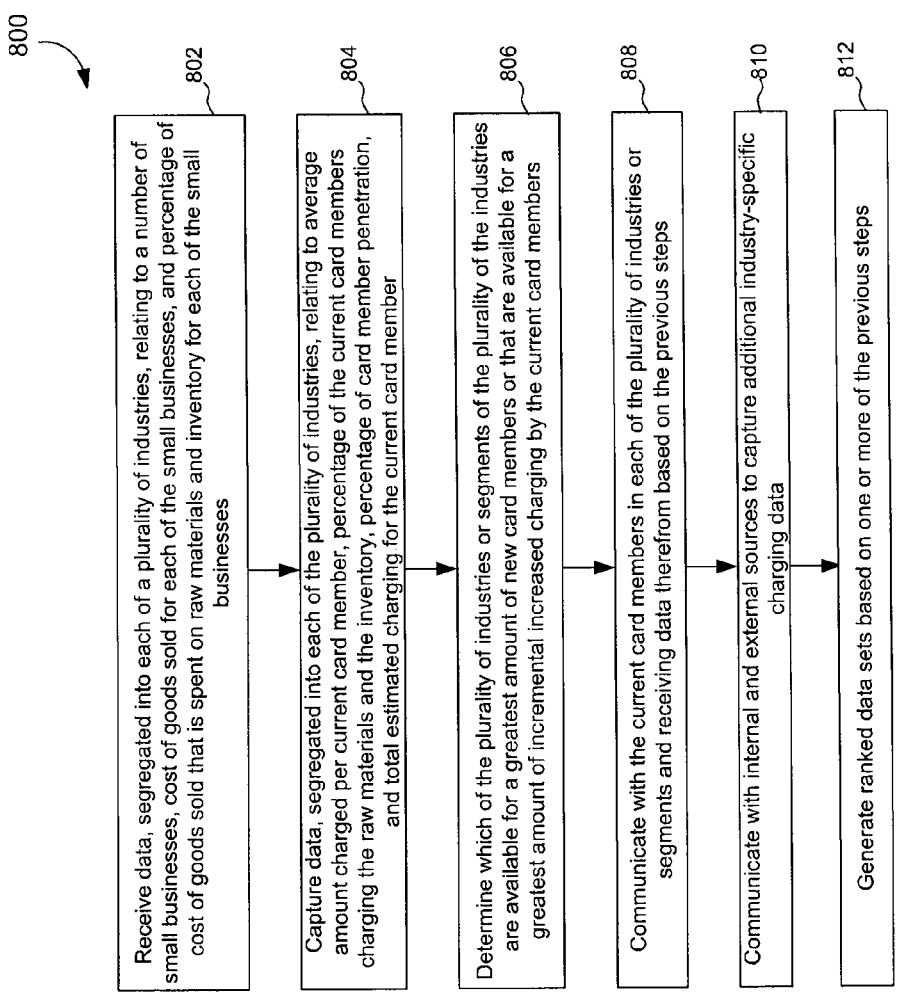
FIG. 8 shows a flowchart depicting another exemplary overall method.

FIG. 8 shows a flowchart depicting a method 800. Method 800 is another exemplary method to determine which existing or current card members 110 may have the greatest incremental increase in spend potential and/or for determining what industries, or segments of the industries, have the best opportunity to find potential new card members. In step 802, data is received that is segregated into each of a plurality of industries, relating to a number of small businesses, cost of goods sold for each of the small businesses, and percentage of cost of goods sold that is spent on raw materials and inventory for each of the small businesses. In step 804, data is captured that is segregated into each of the plurality of industries, relating to average amount charged per current card member, percentage of the current card members charging the raw materials and the inventory, percentage of card member penetration, and total estimated charging for the current card members. In step 806, which of the plurality of industries or segments of the plurality of the industries are available for a highest potential for new card members or that are available for a greatest amount of incremental increased charging by the current card members is determined. In step 808, the current card members in each of the plurality of industries or segments determined from the previous steps are communicated with, and data relating to their feedback is received therefrom. In step 810, internal and external sources are communicated with to capture additional industry-specific charging data. This can be used to validate whether for the focused on companies, industries, or segments, both current card holders and potential new card holders, would really be interested in increasing their charging for certain types of expenses. For example, data relating to industry reports and census data is received. In step 812, ranked data sets, or final ranked data sets, are generated based on information gathered and analyzed in the previous steps.

Therefore, the embodiments discussed above elegantly and effectively highlight high-potential opportunities, while at the same time determining the behavior of purchasers making it infinitely easier to market to specific purchasing groups, highlighting their "pain" points, and how an issuer can help them. The issuer is able to efficiently (both cost and time) identify and prioritize segments in a holistic manner, accounting for internal and external factors, as well as qualitative insights. Previously, this process was completed in a one-off fashion, without the ability to compare opportunities across a number of dimensions. The above processes allow for a faster and more effective capability to search for, identify, and prioritize spend and acquisition opportunities in select industries and/or industry segments. This can save the issuer both time and resources given that fewer people will need to be devoted to the process and those who are will be able to complete the process more quickly.

Figure 9:
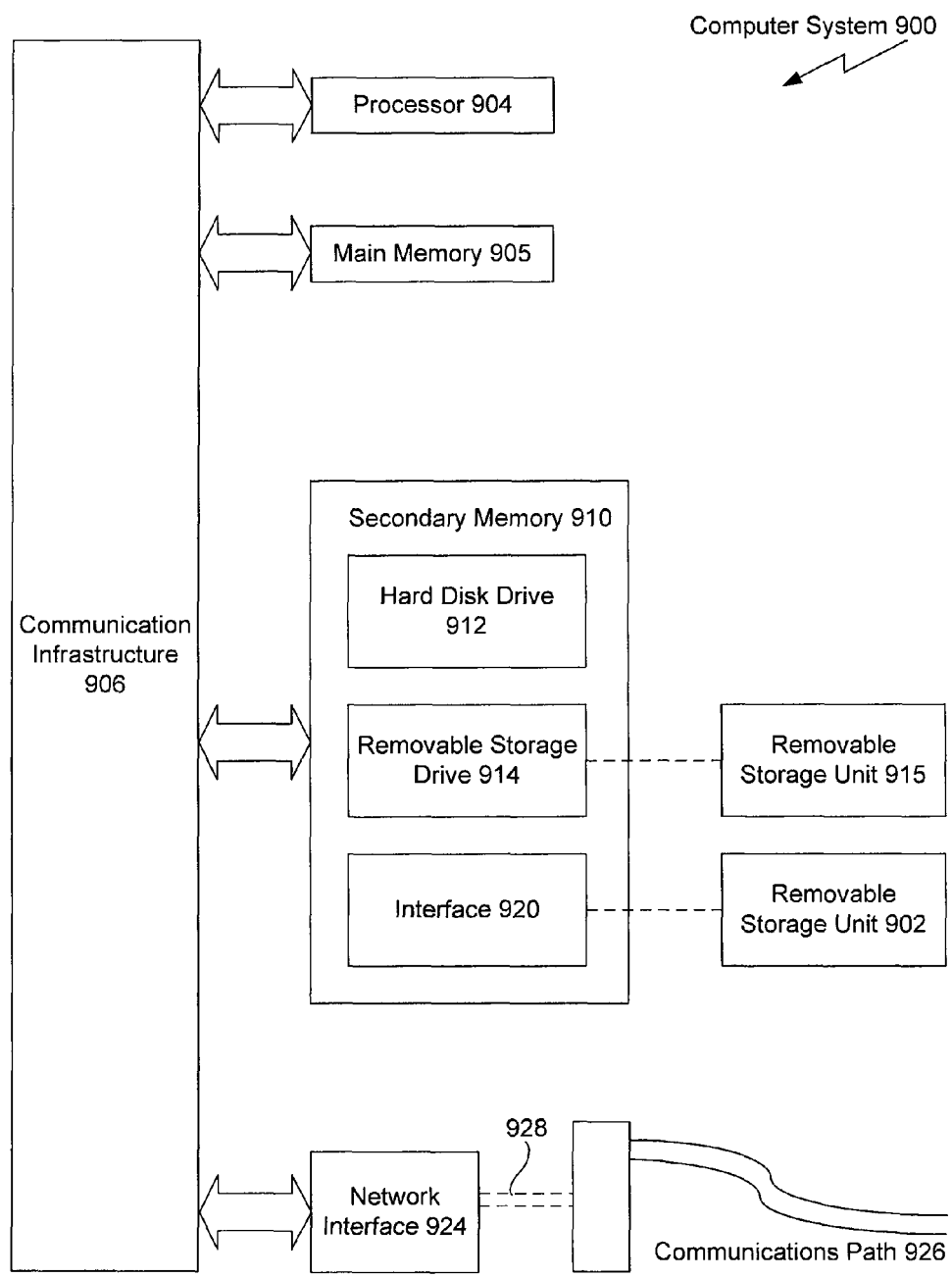
FIG. 9 is a block diagram of an exemplary computer system for use with the system and method of this invention.

In one embodiment, the invention is directed toward one or more computer systems capable of carrying out the functionality described herein. An example of a computer system 900 capable of carrying out the functions of this invention is shown in FIG. 9.

Computer system 900 includes one or more processors, such as processor 904. Processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from communication infrastructure 906 (or from a frame buffer not shown) for display on display unit 916.

Computer system 900 also includes a main memory 908, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, etc. Removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable computer system 900 to perform the features of the present invention, as discussed herein. In particular, the computer programs, when executed, enable processor 904 to perform the features of the present invention. Accordingly, such computer programs represent controllers of computer system 900.

In an embodiment where the invention is implemented using software, the software may be stored in a computer program product and loaded into computer system 900 using removable storage drive 914, hard drive 912 or communications interface 924. The control logic (software), when executed by processor 904, causes processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    generating, by a computer-based system for determining desired industry segments, a first ranking of an industry segment based upon a first data set, wherein the first data set relates to a group of merchants in an industry segment, and wherein the first data set includes at least one of: a cost of goods sold associated with at least a subset of the merchants within the industry segment, a number of the merchants associated with the industry segment, and a raw materials and inventory cost of goods sold associated with at least the subset of the merchants within the industry segment, and wherein each of the data in the first data set is weighted;
    generating, by the computer-based system, a second ranking of the industry segment based upon a second data set, wherein the second data set relates to a group of merchant account holders in the industry segment, and wherein the second data set includes at least one of: an average amount of spending for the merchant account holders within the industry segment, a percentage of merchant account holders actively spending on raw materials and inventory in the industry segment, a merchant account holder penetration in the industry segment, and a total estimated amount of spending for transaction accounts in the industry segment, and wherein each of the data in the second data set is weighted;
    validating, by the computer-based system and based upon a third data set, that a merchant in the group of merchants in the industry segment is interested in increasing charging, wherein the third data set includes data acquired through at least one of interviews with industry experts, interviews with business owners, data associated with industry reports and census data;

generating, by the computer-based system, a third ranking of the industry segment based upon the validating;

combining, by the computer-based system, the first ranking, the second ranking, and the third ranking to generate a combined ranking;

determining, by the computer-based system and based upon the combined ranking, at least one of: that the industry segment is available for an increase in charging by the group of merchant account holders and a potential for new account holders in the industry segment; and targeting for follow up communications, by the computer-based system and in response to the determining, at least one of: a merchant in the group of merchants in the industry segment and a merchant account holder in the group of merchant account holders in the industry segment.

2. The method of claim 1, further comprising repeating the method for groups of merchants and merchant account holders in a different industry segment, the method yielding a different combined ranking related to the different industry segment, the different combined ranking enabling evaluation of the different industry segment to determine at least one of: that the different industry segment is available for an increase in charging by the group of merchant account holders and a potential for new account holders in the different industry segment.

3. The method of claim 2, further comprising comparing the combined ranking and the different combined ranking to determine which of the industry segment and the different industry segment represents a more desirable marketing opportunity.

4. The method of claim 3, wherein the number of merchants associated with the different industry segment receives a weighting of two (2), the cost of goods sold associated with at least a subset of the merchants within the different industry segment receives a weighting of five (5), and the raw materials and inventory cost of goods sold associated with at least the subset of the merchants within the different industry segment receives a weighting of three (3).

5. The method of claim 3, wherein the average amount of spending for the merchant account holders within the different industry segment receives a weighting of two (2), the percentage of merchant account holders actively spending on raw materials and inventory in the different industry segment receives a weighting of three (3), the merchant account holder penetration in the different industry segment receives a weighting of one (1), and the total estimated amount of spending for transaction accounts in the different industry segment receives a weighting of four (4).

6. The method of claim 1, wherein each of the first ranking, the second ranking, the third ranking, and the combined ranking are one of: very high, high, medium, medium/low, low, and very low.

7. The method of claim 1, wherein the number of merchants associated with the industry segment receives a weighting of two (2), the cost of goods sold associated with at least a subset of the merchants within the industry segment receives a weighting of five (5), and the raw materials and inventory cost of goods sold associated with at least the subset of the merchants within the industry segment receives a weighting of three (3).

8. The method of claim 1, wherein the average amount of spending for the merchant account holders within the industry segment receives a weighting of two (2), the percentage of merchant account holders actively spending on raw materials and inventory in the industry segment receives a weighting of three (3), the merchant account holder penetration in the industry segment receives a weighting of one (1), and the total estimated amount of spending for transaction accounts in the industry segment receives a weighting of four (4).

9. The method of claim 1, wherein each of the first ranking, the second ranking, the third ranking, and the combined ranking are one of: very high, high, medium, medium/low, low, and very low.

10. The method of claim 1, wherein data acquired through interviews with industry experts and business owners is acquired through at least one of: instant messaging, emailing, telephoning, faxing, and direct mailing.

11. The method of claim 1, wherein the industry segment is classified using a Standard Industry Classification (SIC) code.

12. The method of claim 1, wherein the first data set is received from at least one of: Dun and Bradstreet, U.S. Census, or Almanac of Business and Industrial Financial Data.

13. The method of claim 1, wherein the second data set comprises proprietary merchant account holder data.

14. The method of claim 1, wherein data associated with industry reports comprise data from at least one of: Lexis-Nexis, Forrester, Mintel, Dun and Bradstreet, BizStats, Almanac of Businesses and Industrial Financial Data, and census data.

15. An article of manufacture including a non-transitory, tangible computer readable storage medium having instructions stored thereon that, in response to execution by a computer-based system for determining desired industry segments, cause the computer-based system to perform operations comprising:

generating, by the computer-based system, a first ranking of an industry segment based upon a first data set, wherein the first data set relates to a group of merchants in an industry segment, and wherein the first data set includes at least one of: a cost of goods sold associated with at least a subset of the merchants within the industry segment, a number of the merchants associated with the industry segment, and a raw materials and inventory cost of goods sold associated with at least the subset of the merchants within the industry segment, and wherein each of the data in the first data set is weighted;

generating, by the computer-based system, a second ranking of the industry segment based upon a second data set, wherein the second data set relates to a group of merchant account holders in the industry segment, and wherein the second data set includes at least one of: an average amount of spending for the merchant account holders within the industry segment, a percentage of merchant account holders actively spending on raw materials and inventory in the industry segment, a merchant account holder penetration in the industry segment, and a total estimated amount of spending for transaction accounts in the industry segment, and wherein each of the data in the second data set is weighted;

validating, by the computer-based system and based upon a third data set, that a merchant in the group of merchants in the industry segment is interested in increasing charging, wherein the third data set includes data acquired through at least one of interviews with industry experts, interviews with business owners, data associated with industry reports and census data;

generating, by the computer-based system, a third ranking of the industry segment based upon the validating;

combining, by the computer-based system, the first ranking, the second ranking, and the third ranking to generate a combined ranking;

determining, by the computer-based system and based upon the combined ranking, at least one of: that the industry segment is available for an increase in charging by the group of merchant account holders and a potential for new account holders in the industry segment; and targeting for follow up communications, by the computer-based system and in response to the determining, at least one of: a merchant in the group of merchants in the industry segment and a merchant account holder in the group of account holders in the industry segment.

16. A system comprising:

a processor for determining desired industry segments;

a tangible, non-transitory memory configured to communicate with the processor, the tangible, non-transitory memory having instructions stored thereon that, in response to execution by the processor, cause the processor to perform operations comprising:

generating, by the processor, a first ranking of an industry segment based upon a first data set, wherein the first data set relates to a group of merchants in an industry segment, and wherein the first data set includes at least one of: a cost of goods sold associated with at least a subset of the merchants within the industry segment, a number of the merchants associated with the industry segment, and a raw materials and inventory cost of goods sold associated with at least the subset of the merchants within the industry segment, and wherein each of the data in the first data set is weighted;

generating, by the processor, a second ranking of the industry segment based upon a second data set, wherein the second data set relates to a group of merchant account holders in the industry segment, and wherein the second data set includes at least one of: an average amount of spending for the merchant account holders within the industry segment, a percentage of merchant account holders actively spending on raw materials and inventory in the industry segment, a merchant account holder penetration in the industry segment, and a total estimated amount of spending for transaction accounts in the industry segment, and wherein each of the data in the second data set is weighted;

validating, by the processor and based upon a third data set, that a merchant in the group of merchants in the industry segment is interested in increasing charging, wherein the third data set includes data acquired through at least one of interviews with industry experts, interviews with business owners, data associated with industry reports and census data;

generating, by the processor, a third ranking of the industry segment based upon the validating;

combining, by the processor, the first ranking, the second ranking, and the third ranking to generate a combined ranking;

determining, by the processor and based upon the combined ranking, at least one of: that the industry segment is available for an increase in charging by the group of merchant account holders and a potential for new account holders in the industry segment; and targeting for follow up communications, by the processor and in response to the determining, at least one of: a merchant in the group of merchants in the industry segment and a merchant account holder in the group of merchant account holders in the industry segment.

17. The system of claim 16, further comprising repeating the operations for groups of merchants and merchant account holders in a different industry segment, the operations yielding a different combined ranking related to the different industry segment, the different combined ranking enabling evaluation of the different industry segment to determine at least one of: that the different industry segment is available for an increase in charging by the group of merchant account holders and a potential for new account holders in the different industry segment.

18. The system of claim 17, further comprising comparing the combined ranking and the different combined ranking to determine which of the industry segment and the different industry segment represents a more desirable marketing opportunity.

19. The system of claim 18, wherein the number of merchants associated with the different industry segment receives a weighting of two (2), the cost of goods sold associated with at least a subset of the merchants within the different industry segment receives a weighting of five (5), and the raw materials and inventory cost of goods sold associated with at least the subset of the merchants within the different industry segment receives a weighting of three (3).

20. The system of claim 18, wherein the average amount of spending for the merchant account holders within the different industry segment receives a weighting of two (2), the percentage of merchant account holders actively spending on raw materials and inventory in the different industry segment receives a weighting of three (3), the merchant account holder penetration in the different industry segment receives a weighting of one (1), and the total estimated amount of spending for transaction accounts in the different industry segment receives a weighting of four (4).

\* \* \* \* \*